May 23, 1967 E. J. CROSSLAND 3,321,741
APPARATUS FOR SEISMIC CURVE FOLLOWING, REPRODUCING
AND RECORDING
Filed June 11, 1959 6 Sheets-Sheet 4

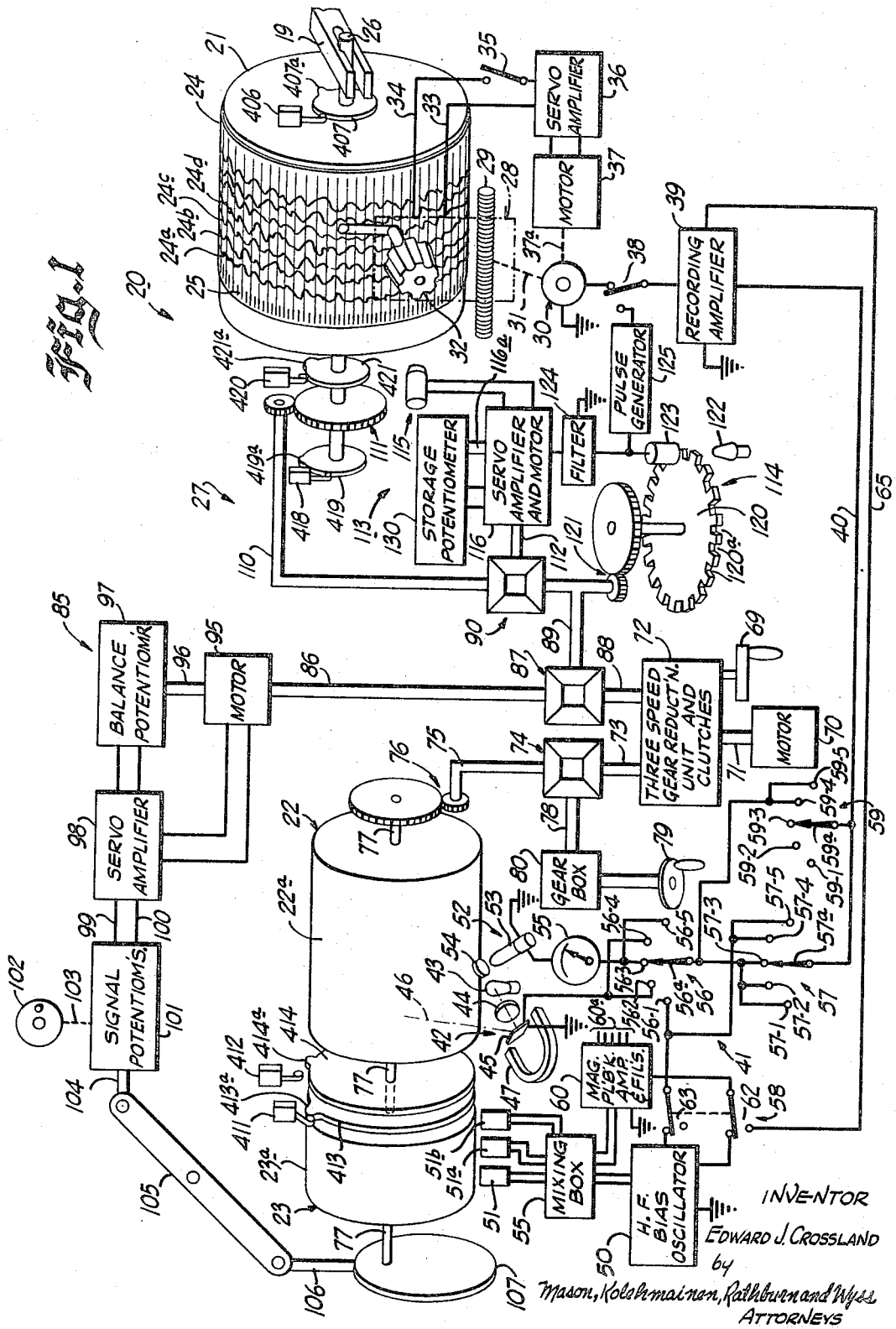

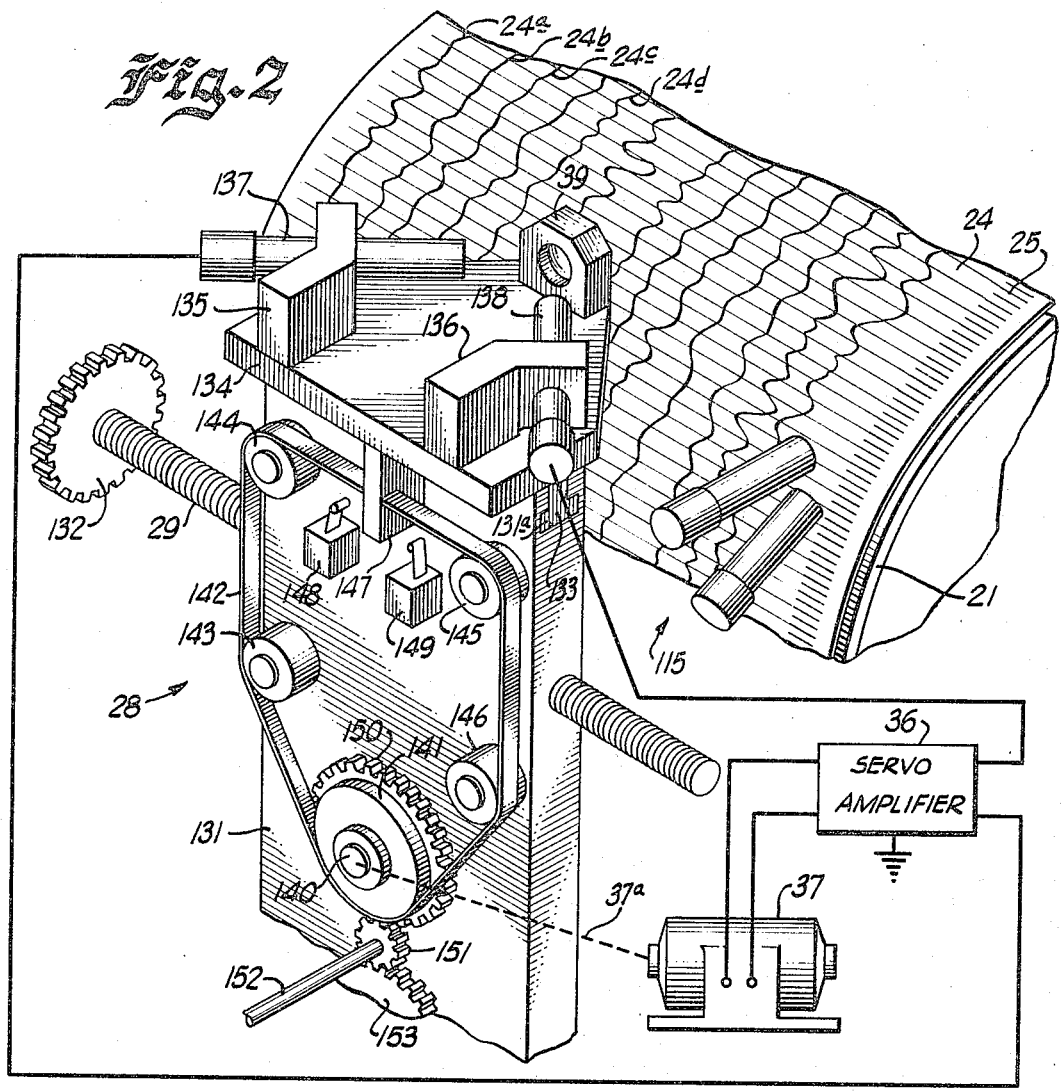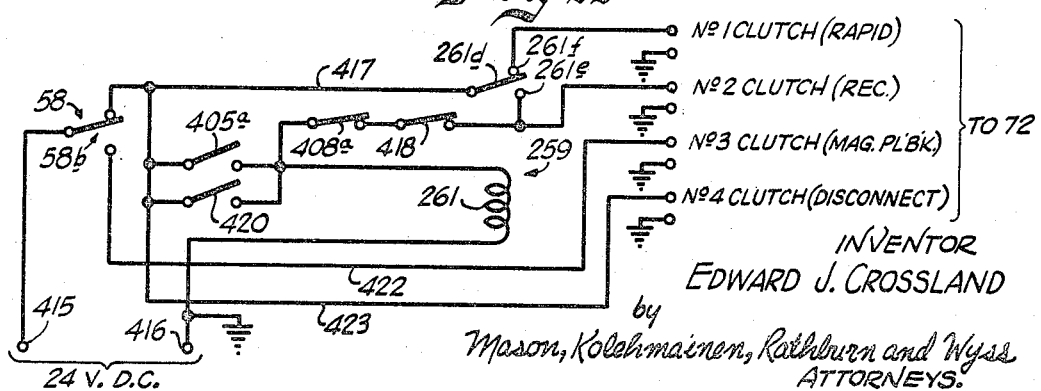

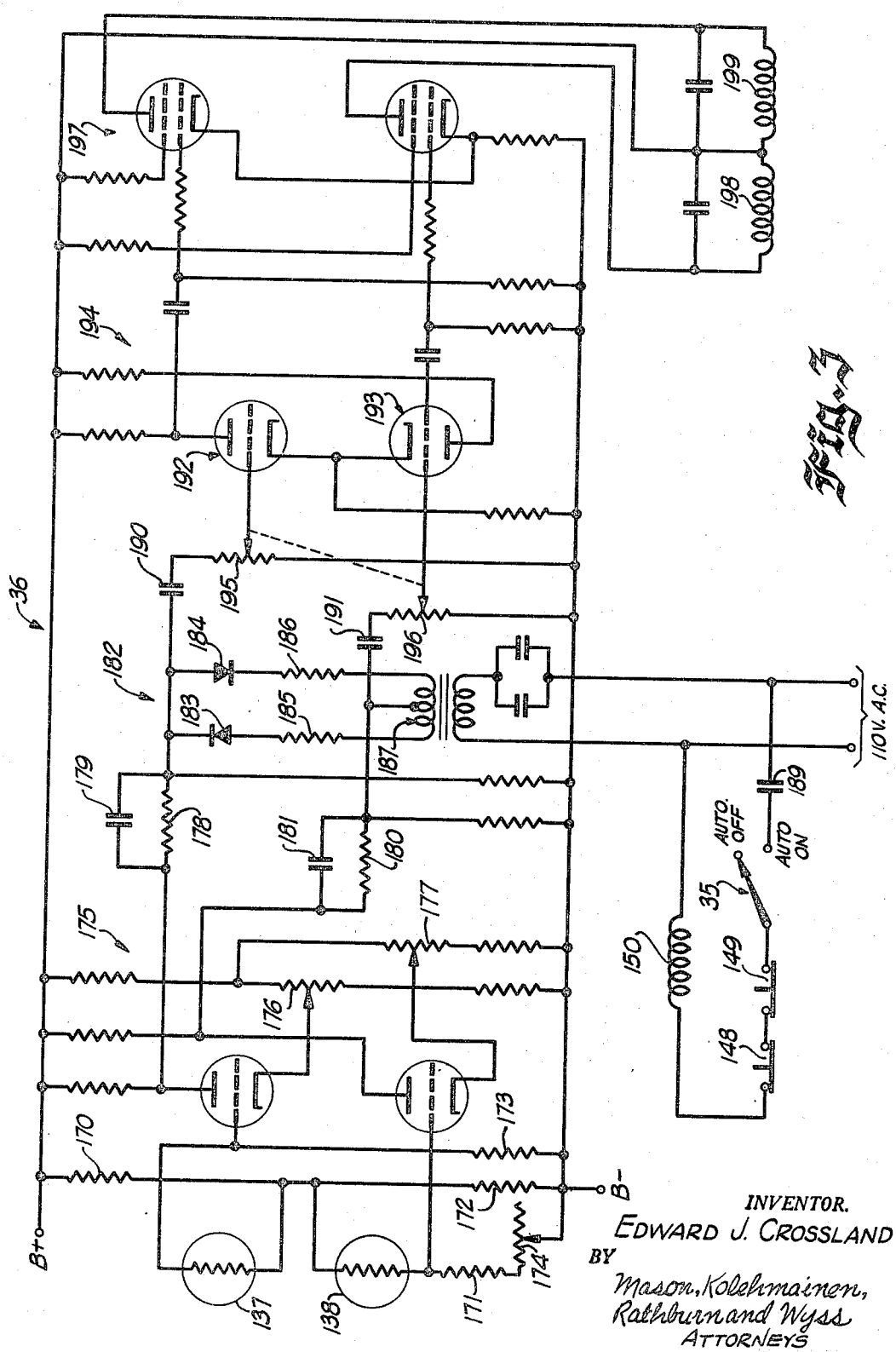

INVENTOR
by EDWARD J. CROSSLAND
Mason, Kolehmainen, Rathburn and Wyss
ATTORNEYS.

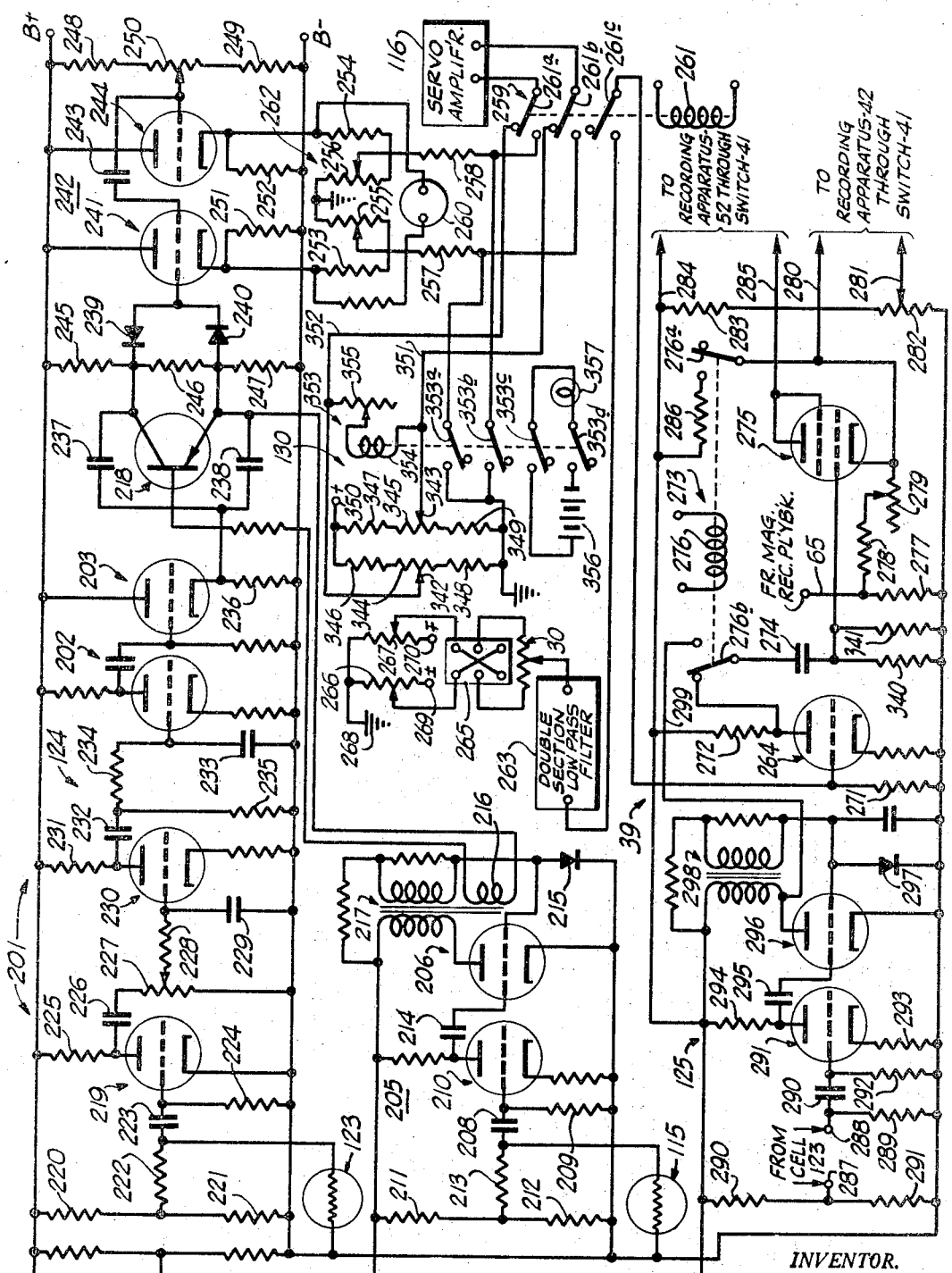

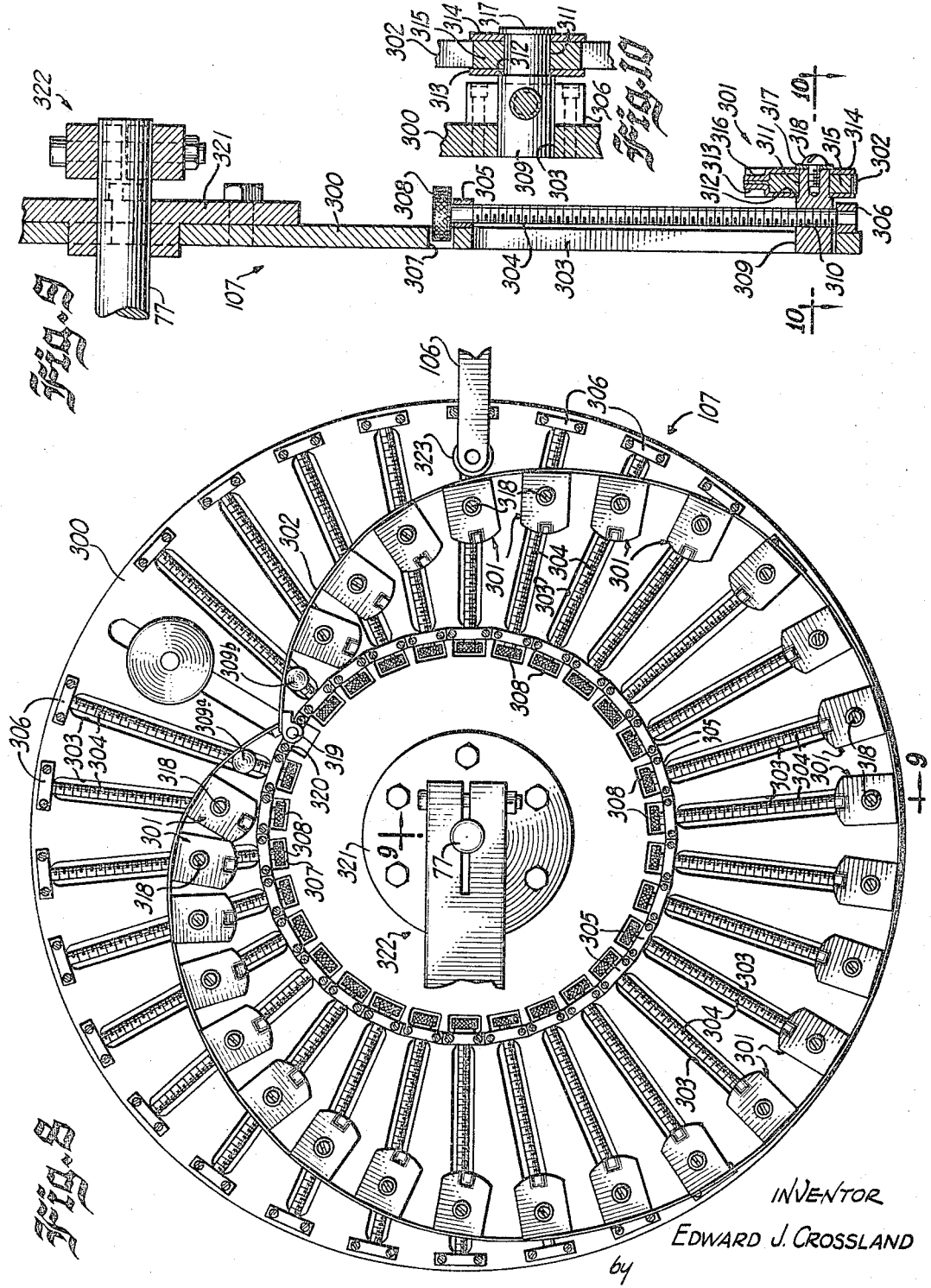

United States Patent Office 3,321,741
Patented May 23, 1967

3,321,741
APPARATUS FOR SEISMIC CURVE FOLLOWING, REPRODUCING AND RECORDING
Edward J. Crossland, Tulsa, Okla., assignor to Seismograph Service Corporation, Tulsa, Okla., a corporation of Delaware
Filed June 11, 1959, Ser. No. 819,708
26 Claims. (Cl. 340—15.5)

The present invention relates generally to an apparatus for following variable amplitude curves of the type produced in seismic surveying by conventional recording galvanometers, converting the energy on these curves into electrical signals and re-recording the electrical energy either on a cross section record or on a reproducible magnetic record or on both such records. More specifically, this invention is an improvement over copending application, Ser. No. 605,847, filed Aug. 23, 1956, by James E. Hawkins, which application is assigned to the same assignee as the present invention and has now been abandoned..

In the art of seismic prospecting, records are made in the field of the signals arriving at a plurality of spaced apart detectors or geophones from a source of seismic wave disturbances such as a detonated shot. Signals arriving at each geophone are recorded as a separate channel or trace upon the record and the different channels are recorded side-by-side. Several years ago most of the field records were produced by recording galvanometers so that the traces were of the variable amplitude type but the present trend is toward magnetic recording in the field, principally because magnetic records are smaller and, hence, are easy to store and handle, they readily lend themselves to use with electrical filtering equipment and the signals from the individual traces can be composited or added together very easily. For all of these reasons, the use of magnetic recording in producing the field records is gaining increasing favor.

Another noticeable trend in the art is the use of the field records during playback in the production of so-called cross section or profile records which represent the channels or traces from a plurality of field records oriented in side-by-side relationship. Such a profile is generally produced by playing back the different field records one at a time and re-recording the traces on each record either simultaneously or one at a time. In either case the traces from several field records are oriented in side-by-side relationship after the introduction of time corrections to compensate for static effects such as elevation, weathering and the like and also to compensate for dynamic effects such as geophone spread and the variations in velocity of the seismic waves with depth. It has been found that variable density records are often preferred for cross-sectional work due to the fact that they present the information in a manner which is easy to read since the contour and orientation of the subsurface interfaces of interest are usually depicted very clearly.

In running a new survey with modern equipment, of course, the field records can be made magnetically and these records can be played back to produce a variable density record without difficulty. However, most of the old records presently contained in the files of oil companies or exploration companies are of the variable amplitude type made by conventional recording galvanometers. While these old records frequently contain all of the information concerning the make-up of the subsurface structures, such information cannot be extracted very easily and, in addition, the improved compositing and filtering techniques available with magnetic recording and playback cannot be realized. Thus, in the examination of areas which have previously been surveyed, it has been customary, prior to the present invention, to run a complete new survey using magnetic recording. It will be appreciated that it frequently becomes desirable to resurvey an area either to determine whether possible oil bearing formations may have been overlooked during the original survey, or to determine whether drilling of new wells at a slightly different location might be advantageous in the extraction of petroleum or gas from the subsurface formations. The present invention makes it possible to reconstruct or re-examine an old survey by using the variable amplitude record already contained in the files and without resorting to the expensive and time consuming procedure of running a complete new survey.

In accordance with the present invention this is accomplished by providing an apparatus for following the amplitude variations of the curves recorded on variable amplitude records in order to develop electrical signals corresponding to these amplitude variations. The electrical signals are then re-recorded either magnetically or in the form of corrected variable density or galvanometer cross sections. In all cases, the re-recorded signals are fully corrected for static effects such as weathering, elevation and datum and for dynamic effects such as geophone spread and the variations in velocity of the seismic waves with depth. In accordance with an important feature of the invention, provision is also made to correct for differences in the nominal recording speed used during the production of the field records and also for speed variations from this nominal recording speed resulting from undesired changes which occurred during the original recording. Moreover, even though the speed control during the original recording was excellent, non-uniform paper shrinkage existing between the different records, or existing from place to place on the same record, may introduce substantial errors and the present invention provides for the elimination of such errors.

It is, therefore, a primary object of the present invention to provide a new and improved apparatus for use in converting variable amplitude records to a different form.

A further object of the invention is to provide an apparatus of the character described above wherein variable amplitude curves can be converted either to reproducible magnetic records or to variable density or galvanometer cross section records or to both magnetic and cross sections records simultaneously.

A further object of the invention is to provide new and improved apparatus for introducing the static and dynamic time corrections during the conversion of the variable amplitude record so that the re-recorded signals are fully corrected with respect to time.

The invention has for another object the provision of a new and improved cam mechanism for use in introducing the dynamic corrections referred to above.

The invention has for a further object the provision of apparatus of the character described above including means to compensate for different recording speeds of the original variable amplitude records and for any undesired speed variations which occurred during the original recording of these records.

A further object of the invention is to provide apparatus of the character described above including means to compensate for differential paper shrinkage existing between the original records or between different areas of the same record so that the re-recorded signals will appear in proper time positions.

Another object of the invention is to provide apparatus of the type described above wherein the traces or channels on the original variable amplitude type records are followed one at a time and wherein the apparatus includes a novel means for zeroing the original record with respect to the follower at the start of each trace.

It is a further object of the invention, in accordance with the preceding object, to provide apparatus wherein the zeroing is effected by summing up the total speed corrections introduced during the following of each trace and wherein this sum is employed to drive the original record at the end of each playback cycle.

The invention, both as to its organization and manner of operation, together with further objects and advantages, will best be understood by reference to the following detailed description taken in conjunction with the accompanying drawings wherein:

FIG. 1 is a functional diagrammatic view showing a curve following and re-recording apparatus characterized by the features of the present invention;

FIG. 2 is a diagrammatic view illustrating the curve follower used in developing electrical signals corresponding to the amplitude variations on the variable amplitude records employed in the system shown in FIG. 1;

FIG. 3 is a schematic diagram showing the electrical circuits employed in the curve tracking or following apparatus illustrated in FIG. 2;

FIG. 5 is a schematic diagram showing the electrical circuits employed in the time line corrector shown in FIG. 4;

FIG. 8 is a front elevational view showing the construction of a velocity cam employed in the apparatus shown in FIG. 7 for the purpose of introducing the velocity function in the dynamic corrections;

FIG. 9 is an enlarged sectional view taken along a line substantially corresponding to the line 9—9 in FIG. 8;

FIG. 10 is an enlarged, fragmentary, sectional view taken along a line substantially corresponding to the line 10—10 in FIG. 9 assuming, of course, that the latter shows the entire structure; and FIG. 11 is a schematic diagram showing a D.C. control circuit used in the system shown in FIG. 1 to control the speed of drive of the playback and re-recording drums.

Figure 4:
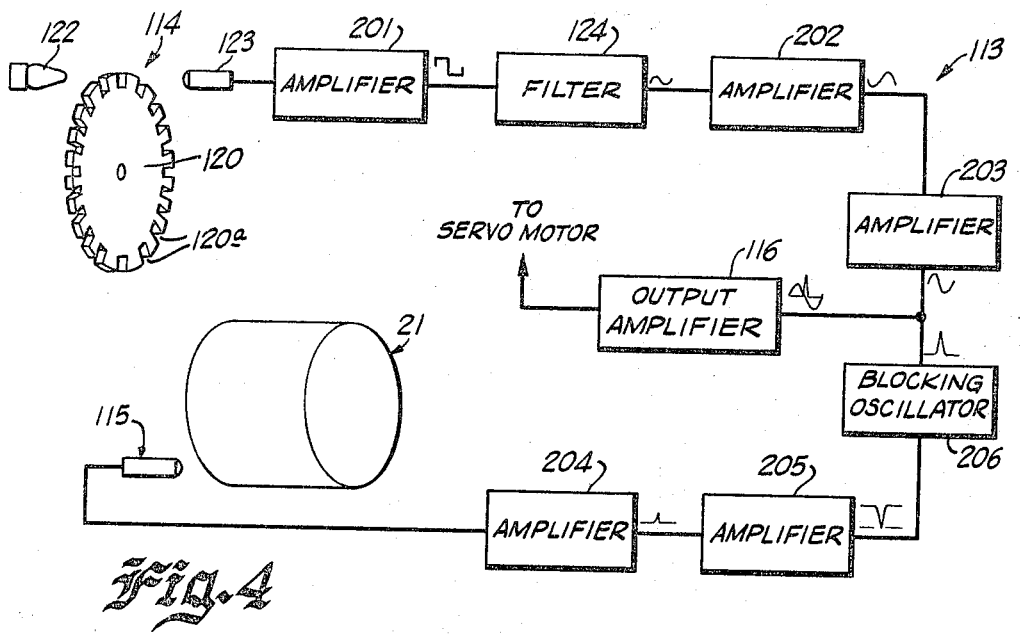
FIG. 4 is a functional block diagram showing the time line corrector employed in the apparatus shown in FIG. 1 to compensate for variations in the recording speed of the original records and for differential paper shrinkage.

Referring now to the drawings and first to FIG. 1, the curve following, converting and re-recording apparatus of the present invention is there indicated generally by the reference numeral 20 and comprises three drums, namely, a tracking drum 21, a cross section drum 22 and a magnetic recording drum 23. For the purposes of illustration, the drums 22 and 23 are shown as being of approximately the same diameter, although in actual practice, this is not true since the magnetic recording drum is considerable smaller than the cross section drum. The apparatus 20, as indicated above, is adapted to convert signals from a variable amplitude record 24 supported on the tracking drum 21 into corresponding electrical signals for re-recording on a magnetic tape 23a carried by the drum 23 and/or for re-recording on a cross section record 22a carried by the drum 22. As will be understood by those skilled in this art, the record 24 is a field record produced by recording the signals from a shot point or other seismic wave disturbance arriving at a plurality of spaced apart geophones or seismic wave detectors. Usually these geophones are colinear and are aligned with the shot point although this is not necessary.

In making a survey, several records like the record 24 are made using different shot points and/or different geophone arrangements and these records may be supplied one at a time to the apparatus 20 for conversion. Each of the records 24 includes a plurality of side-by-side variable amplitude traces or channels 24a, 24b, 24c, etc. with each trace corresponding to the signals arriving at one of the geophones in the spread. The apparatus 20 is adapted to convert these traces one at a time and in sequence. The record 24 also includes a plurality of timing lines 25 which are generally recorded during the original recording operation. These lines may extend transversely across the entire width of the records 24 or, alternatively, they may be relatively short and disposed adjacent one edge of the record. The record 24 is in the form of an elongated strip having its opposed ends detachably clamped to the tracking drum 21. The records 24 may have been produced at nominal recording speeds in the vicinity of 10, 12 or 15 inches per second. The length of the record 24 obviously varies with the recording speed used and, to permit the apparatus 20 to handle records made in the vicinity of any of the three speeds, provision is made for using drums 21 of different size. Thus, when records having a nominal recording speed near 10 inches per second are being converted, a relatively large diameter tracking drum is used, when records 24 having a nominal recording speed near 12 inches per second are being converted, an intermediate diameter drum 21 is used, and when records 24 having a nominal recording speed near 15 inches per second are being converted at tracking drum of relatively small diameter is selected. Generally, a large number of records of the same nominal recording speed is converted for any particular job since a given survey will use only one recording speed and, for this reason, frequent interchange of the tracking drums will not be necessary.

Regardless of the size of the tracking drum, it is supported upon a rotatable drive shaft 26 and is provided with suitable spaced apart balancing weights (not shown) in order to balance it both statically and dynamically. A Prony brake 19 is provided for braking the shaft 26. The shaft 26 is driven from a drive mechanism 27, in order to rotate the drum 21 and the record 24 past a tracking apparatus 28 located in proximity to the record. The tracking apparatus 28 may be moved laterally of the drum 21 along a lead screw 29 in order to move this apparatus into alignment with different ones of the traces 24a, 24b, 24c, etc. The tracking apparatus, as will be described more fully hereinafter, is provided with means for automatically following one of the traces 24a, 24b, 24c, etc. and for driving a potentiometer 30 through a mechanical drive 31 indicated by a broken line, thereby to develop electrical signals corresponding to the amplitude variations on the trace being followed. The tracking may also be done manually by operation of a control knob 32 which effectively overrules the automatic operation. The tracking device is of the balanced type so that it develops no signals when it is confronted either by an all white area or by an all black area of the record 24 and as a result the timing lines 25 do not affect the tracking. The signals developed by the tracking apparatus 28 are supplied through signal conductors 33 and 34 and through a manually operable Automatic Tracking On-Off switch 35 to a servo-amplifier 36. The latter amplifier develops an A.C. control signal for driving a servomotor 37 which is, in turn, connected through mechanism 37a to drive the potentiometer 30 so that this potentiometer develops a signal corresponding to the position of the tracking apparatus 28. The electrical signal appearing across the potentiometer 30 is applied through a manually operable Time Line-Signal Record switch 38 to a recording amplifier 39. The switch 38, as will be described more fully hereinafter, in the position shown applies signals from the potentiometer 30 to the input of the recording amplifier but it may be thrown to a second position where it supplies time line signals to the recording amplifier 39 so that timing signals can be recorded either on the magnetic tape 23a or on the cross section record 22a. Assuming that the switch 38 is in the position shown, electrical signals developed by the potentiometer 30 are applied through the recording amplifier 39 and through signal conductor 40, to a manually operable magnetic recording control switch 41. The switch 41 comprises three sections 56, 57 and 59 having movable poles 56a, 57a and 59a, respectively, which are movable in unison between five different operating positions. Switch 41 thus may be rendered effective to effect magnetic recording only, to develop a galvanometer cross section only, to develop a variable density cross section only, to develop simultaneously a magnetic record and a galvanometer cross section or to develop simultaneously a magnetic record and a variable density cross section. More specifically, with the switch 41 in its first position, that is, with the movable pole 56a in engagement with a fixed contact 56–1, with the movable pole 57a in engagement with a fixed contact 57–1 and with the movable pole 59a in engagement with a fixed contact 59–1 the signals from the recording amplifier 39 are applied through a Playback-Record Switch 58, when the latter is in its record position as shown, to a high frequency bias oscillator 50 of conventional construction. The latter oscillator develops a signal suitable for recording upon the magnetic tape 23a by a magnetic recording head 51 as the drum 23 is turned.

With the switch 41 in its second position i.e., with the movable poles 56a, 57a and 59a in respective engagement with fixed contacts 56–2, 57–2 and 59–2, the output signals from the recording amplifier 39 are applied to a recording apparatus 42 to develop a galvanometer cross section. To effect this recording, the apparatus 42 comprises a conventional galvanometer recorder for developing a variable amplitude signal upon a light sensitive recording medium 22a having its opposed ends detachably secured to the drum 22. More specifically, the apparatus 42 includes a light source 43 and a lens system 44 for focusing the light from the source onto a control coil and mirror 45 which deflects the light beam via a path indicated by the reference numeral 46 onto the surface of the recording medium. The light beam is focused at the point where it impinges on the recording medium so that it becomes effective to expose the light sensitive medium in order to record the signal. Movement of the beam laterally of the recording medium is, of course, effected in conventional manner by the signals supplied to the coil and mirror 45 from the switch 41. As is customary, the coil and mirror are disposed within a magnetic field produced in any suitable manner as, for example, by a permanent magnet 47.

With the switch 41 in its third position illustrated in FIG. 1, i.e., with the contacts 56a, 57a and 59a in engagement with fixed contacts 56–3, 57–3 and 59–3, respectively, the signals from the recording amplifier 39 are applied to a recording apparatus 52 in order to develop a variable density section. To effect the latter recording, the apparatus 52 includes a glow lamp 53 the intensity of which is varied in response to the applied electrical signals. The light from the glow lamp 53 is focused through a lens system 54 to impinge upon a light sensitive medium carried by the drum 22. A suitable meter 55 may be employed for the purpose of indicating the magnitude of the signal supplied to the recording apparatus 52.

When the switch 41 is in its fourth position, i.e., with fixed contacts 56–4, 57–4 and 59–4, respectively engaged by the movable poles 56a, 57a and 59a, signals are applied from the recording amplifier 39 both to the high frequency bias oscillator 50 and to the recording apparatus 42 so that both a magnetic record and a galvanometer cross section are developed simultaneously. Finally, when the switch 41 is in its fifth position with its movable poles 56a, 57a and 59a in respective engagement with fixed contacts 56–5, 57–5 and 59–5, signals from the recording amplifier 39 are simultaneously applied to the high frequency bias oscillator 50 and to the recording apparatus 52 so that a magnetic record and a variable density cross section are produced simultaneously.

Both the cross section drum 22 and the magnetic drum 23 are driven in unison from the drive mechanism 27 and, as a consequence, the magnetic tape 23a is rotated past the recording head 51 while the recording medium 22a is moved past the recording devices 42 and 52. In one form of the invention which has been found to provide satisfactory results the drive mechanism 27 and the drums 22 and 23 are designed to develop magnetic tapes 6.5 seconds in duration and to record the cross section records at a speed of 0.125 inch per second. The described rotation of the drum 23, of course, causes the recording head 51 to develop a magnetic channel or trace on the magnetic tape corresponding to signals developed by tracking one of the traces 24a, 24b, 24c, etc. Thus, when the latter traces are tracked in sequence, a group of corresponding channels or traces are recorded on the tape 23a. In similar manner, each revolution of the drum 22 develops a signal trace upon the recording medium 22a from signals developed by tracking one of the traces 24a, 24b, 24c, etc. Thus, when the latter traces are tracked in sequence a series of side-by-side traces is produced on the medium 22a. The traces on the medium 22a will, of course, be either of the variable density or galvanometer type depending upon the position of the switch 41.

The simultaneous recording of traces on the magnetic record 23a and on the cross section record 22a is an important feature of the present invention since it permits the operator to use the visible trace on the record 22a as a monitor. Thus, by observing the trace on the record 22a, the operator can determine at a glance whether or not the apparatus 20 is functioning properly.

Provision is also made for playing back the traces recorded on the magnetic tape and for re-recording the signals thus reproduced on a cross section record carried by the drum 22. The traces on the magnetic tape can be played back one at a time but preferably, all or several of these traces can be played back simultaneously by using the magnetic head 51 as a pickup head and by also using additional magnetic reproducing heads 51a, 51b, etc. To this end, the total number of pickup heads provided may correspond to the number of traces recorded on the magnetic tape. In actual practice, the magnetic drum is capable of supporting either 26 trace or 28 trace tapes, although only three reproducing heads are illustrated in FIG. 1. The signals reproduced from the magnetic tape are supplied to a mixing box 55 which may be rendered effective to composite the traces by adding together two or more of the signals reproduced by the heads 51, 51a, 51b, etc. or, alternatively, the mixing box 55 may be rendered effective to transmit the signals reproduced by each of the heads without mixing. In any event, the signals either composited or unmixed are transmitted to a magnetic playback amplifier circuit 60 which may include suitable filters of the band-pass type for eliminating a large amount of the spurious signals and noises in order to accentuate the energy corresponding to reflections from subsurface interfaces. The construction and use of such filters is conventional and, hence, they are neither shown nor described in detail. Assuming first that the traces on the tape 23a are played back one at a time or that several traces are composited to produce a single output signal from the magnetic playback amplifier and filters 60, this single signal is transmitted through the Playback-Record switch 58 and through conductor 65 to the recording amplifier 39. The switch 58 includes two sections 62 and 63 and is shown in its Record position where the switch section 62 is ineffective to pass signals to or from the recording amplifier 39 while the switch section 63 is effective to transmit signals from the switch 41 to the high frequency bias oscillator 50. When the switch 58 is thrown to its Playback position, the switch section 63 opens the connection leading to the input of the high frequency bias oscillator 50 and, hence, prevents recording of signals on the tape by the head 51. At the same time, the switch section 62 completes a circuit from the magnetic playback amplifier and filters 60 to the recording amplifier 39. The recording amplifier 39 is, of course, effective to amplify the signals from the playback amplifier 60 and to transmit these signals over the conductor 40 to the switch 41. The latter switch may be placed in either its second or third position to produce a trace on the record 22a either of the galvanometer or variable density type in a manner which will be obvious in view of the foregoing description. Sequential playback of signals from the tape 23a accompanied by adjustment of the recording device 42 or 52 laterally of the record 22a will, of course, result in production of a series of side-by-side channels on the latter record. Any suitable mechanism may be employed for making the lateral adjustment to offset the traces on the record 22a and, hence, this mechanism is not shown in the drawings.

In view of the foregoing description it will be observed that the present invention makes possible the compositing of the playback signals which, in turn, correspond to the variable amplitude traces 24 or 24b etc. on the non-reproducible record 24. The advantages of compositing to accentuate the in-phase or reflected wave energy appearing on the traces composed and to attenuate the out-of-phase noise or spurious signals are well known in this art. Prior to the present invention compositing of the signals of these variable amplitude traces was impossible for several reasons. First, the records 24 are non-reproducible and, hence, signals could not be reproduced for compositing. Second, compositing requires simultaneous reproduction of two or more traces, a result which could not be achieved prior to the present invention.

As indicated previously, provision may also be made for playing back all of the channels on the tape 23a simultaneously thus developing a plurality of signals appearing on signal conductors 60a at the output of the playback amplifier and filters 60. This group of signals may be supplied to a recording apparatus similar to that shown in FIG. 1 for the drum 22 but employing a plurality of recording devices operable simultaneously to develop a cross section record. The latter record may be either of the galvanometer or variable density type.

The drive mechanism 27 includes a drive motor 70 having its output shaft 71 connected to drive a three speed gear reduction unit 72 of conventional construction. The various speeds available from the unit 72 are obtained by selective operation of a plurality of clutches in the unit as will be explained in the ensuing description. One of the output shafts 73 of the gear reduction unit serves as an input to a differential gearing 74 which has its output shaft 75 connected through a gear reduction mechanism 76 to drive a shaft 77 carrying the drums 22 and 23. As will be described more fully hereinafter, a second output shaft 88 of the unit 72 drives the tracking drum 21 during the recording operation so that the latter drum is driven in synchronism with the drums 22 and 23. The differential gearing 74 introduces static time corrections to compensate for such effects as weathering, elevation, datum, etc. by varying the drive relationship existing between the tracking drum and the drums 22 and 23. Thus, the gearing 74 either advances or retracts the drums 22 and 23 with respect to the drum 21 by an amount equal to the static time corrections to be introduced. To this end, the differential gearing 74 has a second input shaft 78 driven by a manually operated crank 79 through a gear box 80. The crank 79 may be provided with suitable means for indicating the amount of correction supplied to the differential gearing 74. Rotation of the shaft 78 by turning the crank 79, of course, alters the relationship existing between the input shaft 73 and the output shaft 75 of the differential gearing and, hence, is effective to either advance or retract the position of the drum 22 with respect to the position of the tracking drum 21. Since the apparatus 20 converts the traces 24a, 24b, 24c, etc. one at a time, the crank 79 may be turned prior to each conversion by the exact amount required to make the static corrections for the particular trace being converted. The crank 79 is not, of course, turned after the recording cycle begins.

To introduce dynamic corrections to compensate for such factors as the geophone spread and the variations in seismic wave velocity as a function of depth, a dynamic correcting mechanism indicated generally by the reference numeral 85 is adapted to alter the drive relationship existing between the drum 21 and the drums 22 and 23 by effectively advancing or retracting the drum 21. It is well known that the dynamic correction varies in accordance with the following function:

$$C = X^2 / 2V^2 T_0 \tag{1}$$

where C is the dynamic correction, X is the distance from the shot point to the geophone (the spread effect), V is the velocity of propagation of the formations (the velocity effect) and $T_0$ is the elapsed travel time. It is, of course, the function of the mechanism 85 to introduce a correction corresponding to the above function. The dynamic corrections supplied are effective to slow down the tracking drum 21 during the first part of the conversion cycle for the record 24 when the velocity of propagation is low and to speed up the tracking drum as the cycle progresses. This permits the cross section drum 22 and the magnetic drum 23 to be rotated synchronously throughout the cycle.

To introduce the desired correction, the mechanism 85 is connected through an output shaft 86 to drive a conventional differential gearing 87 which is also driven by the output shaft 88 of the gear reduction unit 72. The output shaft 89 of the differential gearing 87 drives the tracking drum shaft 26 through a differential gearing 90 to be described more fully hereinafter. The mechanism 85 turns the shaft 86 during the recording cycle in order to alter the drive relationship between the shafts 88 and 89 by an amount corresponding to the dynamic correction to be introduced, thus effectively advancing or retarding the drum 21. To this end the mechanism 85 includes a servo-motor 95 for driving both the shaft 86 and a second shaft 96 connected to a balance potentiometer 97. The balance potentiometer 97 supplies signals to a servo-amplifier 98 for developing error signals used in controlling the motor 95. The servo-amplifier serves to compare the signal from the balance potentiometer 97 with a second signal supplied via conductors 99 and 100 and provides an output or error signal to the motor 95 whenever the two input signals do not coincide. The input signal supplied via conductors 99 and 100 is developed by a signal potentiometer circuit 101 described more fully hereinafter. The signal potentiometer circuit is controlled by a manually operable hand crank 102 through a linkage 103 which sets in the distance factor in Equation 1 above by supplying a signal corresponding to the distance between the geophone and the shot point. A suitable indicator may be associated with the crank 102 for the purpose of indicating the distance X supplied. The crank 102 is adjusted prior to each conversion or recording cycle in order to set in the exact distance between the shot point and the geophone corresponding to the particular trace 24a, 24b, 24c, etc. being converted. Thus, irregular or non-uniform geophone spreads can be corrected. The crank 102 and its associated linkage 103 are capable of setting in geophone to shot distances from zero to three thousand feet. The signal potentiometer circuit 101 is also controlled by an input shaft 104 connected through suitable linkage 105 to a cam follower 106 which is driven by a velocity cam 107 mounted upon the shaft 77. As is described more fully hereinafter, the cam 107 and the linkage 105 supply a signal corresponding to the velocity and travel time factors in Equation 1 so that these factors can be combined in the circuit 101 with the signal supplied from the crank 102 to develop the spread correction. The velocity cam 107 will handle velocity variations from 6,000 to 20,000 feet per second.

As was indicated previously, the drive for the tracking drum 21 passes from the shaft 89 through a differential gearing 90, through a shaft 110 and through a gear reduction mechanism 111 to the shaft 26. Provision may also be made for driving the gear reduction unit 72 manually in the event of failure of the motor 70 by turning a hand crank 69 or the like. The differential gearing 90 is also driven by a shaft 112 which supplies the time corrections referred to above from a time line corrector 113 to compensate for variations in the original recording speed and for differential paper shrinkage. This time line corrector comprises means 114 for generating a standard timing signal corresponding to the nominal original recording speed of the record 24, means 115 for reproducing the timing lines 25 from the record 24 and means 116 for comparing the reproduced time lines and the standard timing signal and for providing an error signal to drive the shaft 112 in the event of deviation between the two compared signals. As was indicated previously, the size of the tracking drum 21 is initially selected to place the nominal recording speed of the original record within the range of the time line corrector 113 and the latter corrector then compensates for changes within this range. The means 115 for reproducing the timing lines may take any of the forms well known in the art and, hence, this means will not be described in detail. It suffices to say that the means 115 is effective to develop a pulse for each of the timing lines 25 and to supply the developed signals as a train of pulses to the input of the comparison means 116 which takes the form of a servo-amplifier and motor circuit. The means for generating the standard timing signal comprises a disc 120 driven from the shaft 89 through a gear reduction mechanism 121. Since the rotation of the shaft 89 is altered by the dynamic corrections supplied by the mechanism 85, it will be evident that the rotation of the disc 120 is also affected by these corrections. The disc 120 is provided with a plurality of equally spaced perihperal notches 120a which are adapted to pass a light beam from a light source 122 to a photoelectric collecting cell 123. Obviously, rotation of the disc 120 periodically interrupts this light beam and, hence, causes the output of the photoelectric cell to resemble a square wave. This square wave is supplied to a bandpass filter circuit 124 which passes the fundamental frequency component of the square wave and rejects all of the harmonics, thus developing a sine wave output signal for application to the servo-amplifier and motor circuit 116. The latter circuit compares the sine wave from the filter 124 with the timing line pulses from the time line reproducing means 115 and if these two signals concide, that is, if the timing pulse occurs at the positive-to-negative zero axis cross-over point of the sine wave, the shaft 112 is not driven. In the event that the timing pulse from the means 115 differs from the sine wave from the filter 124, the servo-amplifier means 116 develops a signal of proper magnitude and phase to drive the servo-motor so that the output shaft 112 is turned to advance or retract the drum 21 by an amount sufficient to bring the time line signals into coincidence with the standard signal. Since both the tracking drum 21 and the disc 120 are affected equally by the dynamic corrections introduced by the mechanism 85, it will be evident that these dynamic corrections have no effect on the comparison means 116. If the disc 120 was not altered by the dynamic corrections, the comparison means would, of course, supply error signals to the shaft 112 resulting from the dynamic correction variations of the timing signals from the record 24 thus providing an improper time correction. The time line corrector has a range of plus or minus ten percent of the speed selected by the size of the tracking drum used. In normal operation, the deviation in recording speed and/or paper shrinkage will not exceed the ten percent range for each of the nominal recording speeds.

The drive mechanism 27 is effective to drive the tracking drum 21 during the intervals between the time line comparisons or measurements at a rate which is based upon the amount of error existing at the previous measurement time. Thus, the time corrector 113 makes a measurement, uses this data to alter the position of the shaft 112 and then remains quiescent until the next measurement is taken. In the interim, the drive mechanism 27 continues to drive the shaft 112 under the assumption that the situation will not change between the measurements. If a record 24 of maximum length, i.e., a record which completely encircles the drum 21, is used, then approximately 650 such measurements or comparisons are made during a complete revolution of the drum 21. One hundred comparisons are made for each second of original recording speed of the record 24.

To facilitate an understanding of the function of the time line corrector 113, a specific example should be considered. Thus, if a record having nominal recording speed of 11.5 inches per second is being converted, the 12-inch per second tracking drum is placed on the shaft 26. Since the nominal recording speed is within 10% of the selected drum size the time line corrector 113 would function to continuously advance the tracking drum to cause the timing lines 25 to pass the scanning means 115 at a rate corresponding to 12 inches per second which is the rate of the standard signals from the mean 114. At the same time, the time line corrector 113 removes variations due to changes in the speed of the original recording and/or differential paper shrinkage.

In view of the foregoing description it will be recognized that the signals reproduced from the records 24 are corrected to the standard timing signal produced by the means 114 and, as a consequence, the output of the latter means may be used to supply timing signals for the magnetic record 23a and for the cross section record 22a. Since the timing signals are normally affected by the dynamic corrections, it is necessary to remove these variations when the timing signals are being recorded. This may be done by setting the spread corrector crank 102 to its zero position so that no dynamic corrections are supplied by the mechanism 85. The disc 120 is thus driven at constant speed to develop uniformly spaced pulses from the photoelectric cell 123. The output of the latter cell is passed to a pulse generator 125 which differentiates the square wave and chops off one of the spikes or pulses resulting from the differentiation. The output of the pulse generator is applied through the Time Line-Signal Record switch 38 when the latter is in the Time Line position and through the recording amplifier 39 to the switch 41 where, as indicated above, it may be applied to the magnetic record or to the cross section or to both of these records simultaneously.

The total corrections applied by the time line corrector 113 are applied to a storage potentiometer circuit 130 which sums these corrections and, at the end of the cycle, supplies a signal to the servo-amplifier and motor 116 to drive the shaft 112. The drum 21 is thus advanced or retraced at the end of the cycle by an amount corresponding to the total time line corrections introduced, and, as a result, this drum is returned to its zero position so that the record 24 is properly positioned with respect to the tracking apparatus 28 to begin the conversion of the next trace of the record at the start of the next cycle. Since the traces are all corrected to the standard timing signal, it will be observed that if no corrections are made during the cycle, the tracking drum will make one complete revolution and will then be positioned properly for the start of the next cycle. This is true because the diameter of the drum 21 is selected to correspond exactly with the standard timing line generating means 115. If, during the cycle, the drum is either advanced or retarded it will be displaced from the proper zero position by an amount exactly equal to the advance or retardation and, hence, it is evident that the use of the storage potentiometer circuit 130 to drive the drum at the end of the cycle results in movement of the drum to its proper zero position. The three-speed gear reduction unit 72 is, of course, rendered effective to drive the shaft 88 at a speed commensurate with the size of the tracking drum 21 being used so that the standard timing signal generating means 114 produces timing signals in the range of the nominal recording speed of the record.

Considering in some detail the tracking apparatus 28 and referring first to FIG. 2, it will be observed that this apparatus comprises a vertical support plate 131 mounted for movement laterally of the record 24 near the periphery of the drum 21. To this end, the plate 131 is provided with a transversely extending, horizontal, tapped bore accommodating the lead screw 29. A suitable drive gear 132 mounted on the end of the lead screw 29 is adapted to be engaged by a manually operated gear mechanism (not shown) for the purpose of moving the plate 131 either to the left or to the right as viewed in FIG. 2 depending, of course, upon the direction of turning of the gear 132. The plate 131 is provided at its upper end with a suitable guide slot 131a for slidably receiving a key 133 forming part of a movable carriage 134 supported for movement upon the plate. The carriage 134 includes a flat base from which the key 133 depends and also includes a pair of support blocks 135 and 136 extending upwardly from the base.

The tracking is done by sensing light from the record 24 and by using variations in the light sensed to control the movement of a follower such as the carriage 134. The follower of the present invention acts upon the center of the trace being tracked and, in this respect, it differs from conventional trackers which act upon one edge of a trace or line. This result is achieved by employing a pair of light collecting cells focused to receive light from the trace and having their outputs connected in a balanced circuit arrangement which develops zero output signal when the light reaching the two cells is equal. This arrangement not only makes the tracker of the present invention more accurate than conventional types but, in addition, avoids driving the follower when the cells are viewing totally white or totally black areas of the record. Thus, the tracker of the present invention is not subject to hunting problems plaguing a number of prior devices. In one form of the invention, the light sensitive photoelectric cells 137 and 138 may be mounted on the blocks 135 and 136 to receive light from the record 24 through a lens system indicated by the reference numeral 139. The source of light impinging upon the records may be located between the cells but is not shown in the drawings since it is of conventional construction. In a second form of the invention, the light sensitive cells may be located at the center of the carriage and the light sources may be disposed in the positions occupied in FIG. 2 by the cells 137 and 138.

In either case, the photoelectric cells 137 and 138 are sharply focused through the lens arrangement 139 so that the focal points of the light rays reaching these cells are spaced apart by an amount approximately equal to the width of the lines forming the traces 24a, 24b, 24c, etc. During tracking the carriage 134 is positioned so that the focal points of the cells 137 and 138 are disposed on opposite sides of the trace to be tracked or followed. The cells 137 and 138 are electrically connected to the input of the servo-amplifier 36 in a balanced circuit so that no input signal is developed when the light reaching the two cells 137 and 138 is equal. Thus, when the two cells are focused on a totally white area of the record 24 or on a totally black area of the record 24, the amplifier 36 provides no output signal. During tracking, no signal is developed by the amplifier as long as the two cells effectively span the trace since the light reaching the cells will be exactly equal. If, however, one of the cells receives more light than the other as, for example, when the trace being tracked partially obstructs the flow of light to one cell, the servo-amplifier 36 develops a signal of proper magnitude and phase to drive the servo-motor 37 in a direction tending to rebalance the signals from the two cells 137 and 138. To this end, the output of the servo-motor is mechanically connected through the mechanism 37a to drive the carriage 134. The mechanism 37a may, of course, include suitable reduction gearing or the like but this is not illustrated in the drawings. In any event, the servo-motor 37 drives a shaft 140 journaled for rotation upon the plate 131 and this shaft carries a friction drive wheel 141 in engagement with an endless belt 142 trained over a plurality of spaced apart idler rollers 143, 144, 145 and 146. The belt 142 is clamped to an arm 147 depending downwardly from the base of the carriage 134 with the result that the latter carriage is moved within the slot 131a when the shaft 140 is turned. Thus, the carriage 134 is moved to the left or to the right depending, of course, upon the direction of rotation of the shaft 140 whenever such movement becomes necessary in order to balance the light reaching the cells 137 and 138. As a consequence, the servo-amplifier 36, its associated motor 37 and the described connection between the motor output and the carriage 134 are effective to cause the tracking apparatus 28 to automatically follow the trace on the record 24.

Movement of the carriage 134 is limted by a pair of limit switches 148 and 149 which are connected, as will be described more fully hereinafter, so that the drive to the servo-motor 37 is interrupted when either of the switches is actuated. The automatic tracking apparatus is used whenever the light cells 137 and 138 are capable of following the trace on the record. The shaft 140 can be turned manually to override the automatic tracking so that the carriage 134 can be moved manually in tracking particularly difficult areas such as those areas where the traces on the record cross or are tangent to one another. To this end, the latter shaft carries a gear 150 meshing with a smaller gear 151 mounted upon a shaft 152 which is adapted to be rotated or turned by manual operation of the knob 32 shown in FIG. 1. When the knob 32 is turned the shaft 140 is obviously rotated to move the carriage and to override the servo-motor 37. The percentage of time that automatic tracking can be used, of course, varies with individual records but experience indicates that automatic operation is possible for more than fifty percent of each trace on most records.

To provide an electrical signal indicative of the position of the carriage 134 during either manual or automatic tracking, the gear 151 drives an output gear 153 which is connected to the potentiometer 30 referred to above. The construction of the servo-amplifier 36 is illustrated in FIG. 3 wherein the photoelectric cells 137 and 138 are connected in a voltage divider network at the input to this amplifier. The resistance of the photocells varies with the amount of light reaching the cell, the resistance being very high at low illumination and very low at high illumination. The voltage divider network is connected across the terminals of a D.C. power supply indicated by the usual designations B+ and B—, with this voltage divider comprising, in addition to the cells 137 and 138, resistors 170, 171, 172 and 173 and a balancing potentiometer 174. The voltage divider network supplies D.C. input signal to a D.C. amplifier stage 175 which is of conventional construction and, hence, will not be described in detail. The potentiometer 174 may be adjusted to balance the inputs to the two tube sections used in the amplifier 175 so that equal illumination of the cells 137 and 138 results in zero output signal from the amplifier stage 175. Bias control potentiometers 176 and 177 connected in the cathode circuits of the two tube sections of the amplifier 175 may be adjusted to equalize the gains in the two sections in order to provide equal outputs in response to equal illumination of the two cells. The D.C. signals on the two plates of the amplifier 175 operate in push-pull and are used in a manner described more fully hereinafter to control the A.C. signal supplied to the servo-motor 37. Resistor 178 connected in parallel with capacitor 179 and resistor 180 connected in parallel with capacitor 181 function as anti-hunt networks for the push-pull plate signals of the amplifier 175. The D.C. control signal from the output of these anti-hunt networks is applied to a sensing network 182 consisting of a pair of diodes 183 and 184, a pair of resistors 185 and 186 and the secondary winding of an A.C. signal supplying transformer 187. The signals from the anti-hunt network are applied between the center tap of the transformer secondary winding and the junction of the diodes 183 and 184.

To supply an A.C. signal to the sensing network 182, the primary winding of the transformer 187 is excited by 110 volts from a suitable A.C. source. This same source also supplies A.C. signals through a phase shifting condenser 189 through the Manual-Automatic Tracking on-off switch 35 through the limit switches 148 and 149 to a reference winding 150 in the servo-motor 37. The condenser 189 introduces the proper amount of phase shift to achieve maximum speed of operation of the servo-motor.

When the D.C. signals at the output of the anti-hunt networks are equal, the A.C. signals appearing across resistors 185 and 186 are also equal and are opposite in phase so that no signals are applied from the sensing network 182 through the coupling capacitors 190 and 191. The latter capacitors supply A.C. excitation signals to the control grids of two stages 192 and 193 cooperating to form an A.C. amplifier 194. The signals supplied to the control grids of the stages 192 and 193 are developed across gain potentiometers 195 and 196 which may be adjusted to control the gains of the two stages. As indicated above, whenever equal illumination is applied to the cells 137 and 138, the signals applied to the control grids of the stages 192 and 193 are equal so that no output signal is developed by the amplifier 194. The output of the amplifier 194 is fed through a final push-pull amplifier 197 of conventional construction to control windings 198 and 199 of the servo-motor 37. The magnitude of the A.C. signal from the amplifier 197 to the windings 198 and 199 controls the amount of drive of the servomotor 37 while the phase of this signal controls the direction of rotation. Thus, when one of the photocells 137 or 138 becomes more shaded than the other by the line image from one of the traces 24a, 24b, 24c, etc., the voltage from one of the anti-hunt networks increases while the voltage from the other network decreases as a result of the changes in the two D.C. signals supplied to the control grids of the two stages in the D.C. amplifier 175. The unbalance of D.C. signals applied to the sensing network 182 causes the diodes 183 and 184 to conduct by different amounts so that the voltages developed across resistors 185 and 186 are no longer equal. Thus, the two signals supplied to the stages 192 and 193 are unequal and the push-pull amplifier 197, therefore, develops an A.C. signal of the proper magnitude and phase to drive the servo-motor 37 in a direction to again produce equal shading on the cells 137 and 138. If the other cell becomes shaded, the servo-motor 37 is obviously driven in the opposite direction due to the reversal in phase of the A.C. signals developed by the diodes 183 and 184 and the resistors 185 and 186.

Considering next the time line corrector 113 and referring particularly to FIG. 4 of the drawings, it will be observed that the output of the photocell 123 in the standard timing signals generating means 114 is applied to an amplifier 201. As previously indicated, the timing signal generating means develops a square wave signal which appears at the output of the amplifier 201 as is indicated by the waveform shown in FIG. 4. This square wave, which, of course, consists of a fundamental sine wave and an infinite number of harmonics, is applied as the input to the filter 124. The filter 124, as previously indicated, is tuned to pass the fundamental frequency component of the input square wave and to reject the harmonics, thereby producing a sine wave as indicated by the wave form shown in FIG. 4. This sine wave is passed through amplifiers 202 and 203 and is then supplied to the servo-amplifier circuit 116.

The signals from the timing line generating means 115, as indicated above, comprise a train of pulses which are passed through amplifiers 204 and 205 to produce waves of the type indicated in FIG. 4. The output of the amplifier 205 drives a blocking oscillator 206 of conventional construction which develops a sharp spike for each of the timing pulses. This sharp spike is applied to the input of the servo-amplifier 116 simultaneously with the sine wave from the amplifier 203. The servo-amplifier 116 is adapted to compare the sharp spike from the blocking oscillator 206 with the sine wave from the amplifier 203 and to develop an output signal whenever the spike deviates from the position shown in FIG. 4 where it coincides with the positive-to-negative crossover point at the zero axis of the sine wave. In the event that the spike lags this crossover point, the amplifier 116 develops a signal of one polarity while deviation of the spike in a leading direction results in the development of a signal of the opposite polarity.

Considering now the circuits employed in the time line corrector 113 and in the record amplifier 39, it will be observed from FIG. 5 that the photoelectric cell of the time line signal generating means 115 is connected to supply input signals across a differentiator circuit consisting of a capacitor 208 and a resistor 209 in the grid circuit of a vacuum tube 210 forming part of the amplifier 205. The signal from the photoelectric cell in the signal generating means 115 is developed across a voltage divider network comprising resistors 211 and 212 connected between the B+ and B— terminals of a conventional D.C. power supply. The cell is connected in series with a current limiting resistor 213. The condenser 208 and resistor 209 differentiate the square wave pulses developed by the signal generating means 115 and the resulting positive and negative spikes are supplied to the grid of the tube 210. These spikes appear in the output circuit of the tube 210 and are passed through a coupling condenser 214 to the grid circuit of the blocking oscillator 206 which is of conventional construction. A diode 215 connected between the control grid and the cathode of the blocking oscillator tube eliminates the negative spikes, but the positive spikes drive the tube into oscillation in the usual manner so that a shap and very high amplitude output signal is developed across an output winding 216 in the control transformer 217 of the blocking oscillator.

The sharp pulses developed in the output winding 216 are applied to a transistor 218 for mixing with sine wave signals produced from the output of the standard timing signal generating means 114 in a manner which will become evident as the description proceeds. More specifically, square wave signals from the cell 123 in the standard timing signal generating means 114 are applied to the grid circuit of a vacuum tube 219 forming part of the amplifier 201 referred to above. This signal is developed across a voltage divider network comprising resistors 220 and 221 with the cell being connected in series with another resistor 222. The square wave signal is coupled to the control grid of the tube 219 through a coupling capacitor 223. Resistor 224, of course, provides the usual grid leak or D.C. return for the control grid of the tube 219. The square wave signals are amplified by the tube 219 and are developed across a plate load resistor 225. The output square wave is coupled through a capacitor 226 and is developed across a timing signal gain control potentiometer 227 which may be adjusted to control the amplitude or level of the timing signal applied to the transistor circuit 218. To this end, the tap or arm of the potentiometer 227 is connected through a first filter section comprising resistor 228 and capacitor 229 to the control grid of a vacuum tube 230 also forming part of the amplifier 201. The first filter section, of course, filters the square wave signal in the usual manner and the resulting filtered signal is amplified by the vacuum tube 230 and developed across the plate load resistor 231. This signal is coupled through a pair of filtering circuits including capacitors 232 and 233 and resistors 234 and 235 to develop a sine wave signal which is amplified by the amplifiers 202 and 203 and is applied to the transistor circuit 218. The resistors 234 and 235 and the capacitors 232 and 233 make up the low pass filter 124 referred to above and they are designed to pass the fundamental frequency component of the square wave signal and to eliminate the harmonics. The amplifier 202 is of conventional construction and the amplifier 203 is connected as a cathode follower with the output being developed across a cathode load resistor 236. This output signal is coupled through capacitors 237 and 238 to a pair of back-to-back connected diodes 239 and 240 having their junction point connected to the control grid of the first stage 241 of a two-stage amplifier 242. The diodes 239 and 240 are connected in a voltage divider circuit including resistors 245, 246 and 247 connected between the B+ and B— terminals and the output signal from these diodes is coupled through a capacitor 243 to the control grid of the second stage 244 of the amplifier 242. The signal input to the stage 244 is developed across a voltage divider network comprising resistors 248 and 249 and potentiometer 250 which may be adjusted to obtain a zero or balanced output across the cathode load resistors 251 and 252 when the pulse from the control transformer winding 216 occurs at the positive-to-negative zero axis crossover point of the sine wave appearing at the output of amplifier 203. More specifically, the voltage divider network in the input of the amplifier stage 241 establishes a positive signal level at a value intermediate the B+ and B— voltages and, as a consequence, the sine wave signal applied to the grid of the stage 241 may vary between a high positive value and a somewhat lower positive value, the particular level at any given time being a function of the timing relationship between the pulse from the transformer winding 216 and the sine wave signals from amplifier 203. In one form of the invention found to provide satisfactory results, the sine wave signal impressed on the grid of the amplifying stage 241 may vary between positive 140 volts and positive 125 volts. The time line pulse applied to the transistor circuit 218 from the transformer winding 216 charges the capacitor 243 to the instantaneous voltage appearing on the grid of the amplifying stage 241 at the instant of the pulse. Thus, any deviation of the pulse from the positive-to-negative crossover point at the zero axis of the sine wave causes a corresponding change in conduction of the amplifying stage 241. For example, if the pulse occurs on the positive portion of the sine wave, that is, before the sine wave reaches the crossover point, the capacitor 243 will be charged to a higher positive potential and the amplifying stage 241 will conduct an increased amount of current to develop a greater signal across the cathode resistor 251. Similarly, if the pulse occurs on the negative portion of the sine wave, the capacitor 243 is charged to a lesser positive value and, as a consequence, the amplifying stage 241 conducts less and the signal developed across the cathode resistor 251 therefore drops by a corresponding amount.

The signals from the cathode resistors of the amplifier stages 241 and 244 are developed across a dual potentiometer network 262 including fixed resistors 253 and 254 and a pair of potentiometers 255 and 256 grounded at the junction point of their windings. The taps or arms of the potentiometers 255 and 256 are connected through resistors 257 and 258 and through contacts of a playback-record relay 259 to the input of the servo-amplifier 116 referred to above. This servo-amplifier is, of course, driven in response to signals developed in the dual potentiometers network and, as a consequence, when the peaked pulse from the transformer winding 216 occurs at the crossover point of the sine wave, the servo-amplifier provides no output signal and its associated servo-motor is, therefore, not driven. However, when the peaked pulse is not so oriented with respect to the crossover point of the sine wave, a signal is applied to the servo-amplifier 116 to drive it in the proper direction and by the proper amount to retard or advance the tracking drum 21 by an amount sufficient to make the time line signals coincide with the standard timing signal. A microammeter 260 may be used to indicate the signal applied to the servo-amplifier 116.

The relay 259 is energized when the Playback-Record switch 58 is in the record position since the operating coil 261 of this relay is connected in a circuit including a suitable source of power and a section of the switch 58. When the switch 58 is in the playback position, the coil 261 is not energized but when the switch is in the record position the operating coil is effective to move contacts 261a, 261b and 261c from their deenergized positions illustrated in FIG. 5 to the energized positions. Contacts 261a and 261b thus become effective to supply the output of the dual potentiometer network 262 to the input of the servo-amplifier 116. Contact 261c at the same time supplies the signal from the tracking potentiometer 30 to the recording amplifier 39. More specifically, the contact 261c completes a circuit from the output of a double section low pass filter 263 to the control grid of an amplifier stage 264 in the recording amplifier 39. The double section low pass filter 263 receives signals from the tracking potentiometer 30, described above, which is connected through a reversing switch 265 to a pair of recording amplifier gain potentiometers 266 and 267. The potentiometers 266 and 267 have their junction points grounded as indicated at 268 and the other ends of their windings are connected across a suitable D.C. source applied between terminals 269 and 270. The polarity of the D.C. voltage applied to these terminals is immaterial in view of the fact that the reversing switch 265 can be used to reverse the polarity of the signal developed across the potentiometer 30 in a manner which will be obvious. Thus, the switch 265 can be thrown to a "normal" position to supply signals of one polarity to the filter 263 or to a "reverse" position in which signals of the opposite polarity are supplied to the filter. In any event the signals from the filter 263 are applied across a resistor 271 in the grid circuit of the amplifier 264 and are amplified and developed across a plate load resistor 272. They are applied through the contacts of a time line-signal record relay 273 and through a coupling condenser 274 to be developed across resistors 340 and 341 in the grid circuit of an amplifier 275. The latter circuit is, of course, completed only when the relay 273 is in the deenergized position illustrated in FIG. 5. Condenser 274 is very large, for example, in the order of 4 microfarads, and, hence, is effective to couple any short term or A.C. variations to the grid of the amplifier 275 and to eliminate long term variations. Thus, the signals produced by the potentiometer 30 as a result of tracking the traces are coupled to the amplifier 275, but the long term variations do not affect the amplifier. This is an important feature of the present invention since the long term variations, such for example, as variations caused by skewing of the traces 24a, 24b, 24c, etc. on the record 24, unless eliminated, will cause the variable density record to lighten in areas where such conditions are unwarranted by the signals reproduced from the traces 24a, 24b, etc.

The relay 273 has its operating coil 276 connected in a circuit including a suitable source of power and a section of the Time Line-Signal Record switch 38 referred to above. With the switch 38 in the Signal Record position, the operating coil 276 is not energized and, as a consequence, its contacts 276a and 276b are in the positions shown in FIG. 5 wherein the contact 276b is effective to connect the amplifier 264 to the input of the amplifier 275 and wherein switch section 276a is effective to disconnect the cathode circuit of the amplifier 275 from the B+ terminal. Thus, with the Time Line-Signal Record switch 38 in the Signal Record position, the output of the amplifier 275, which is developed across a pair of cathode load resistors 277 and 278 and a potentiometer 279, is applied to the recording apparatus 42 in the manner described above. The signal applied to the recording apparatus 42 appears between a first lead 280 connected directly to the cathode of the amplifier 275 and a second lead 281 connected to the movable arm of a galvanometer adjusting potentiometer 282 which may be used to control the amplitude of the signal applied to the recording apparatus 42. More specifically, this potentiometer 282 is connected in series with a fixed resistor 283 across the B+ and B— terminals and, as a consequence, this potentiometer may be adjusted to control the positive voltage appearing on its center arm, thereby controlling the D.C. potential existing between the leads 280 and 281. The plate load for the amplifier 275 is connected between leads 284 and 285 and the signal developed across this load is applied to the recording apparatus 52 in the manner indicated above.

When the Time Line-Signal Record switch 38 is in the Time Line position, the relay 273 is energized whereupon switch section 276a connects the cathode load resistors 277 and 278 and the potentiometer 279 in a voltage divider network with a fixed resistor 286 across the B+ and B— terminals, thus establishing the operating potential for the amplifier 275. Switch section 276b, on the other hand, supplies time line signals to the grid circuit of the amplifier 275. More specifically, these time line signals are derived by applying the output of the cell 123 across terminals 287 and 288 in the grid circuit of an amplifier 291. These signals are applied through contacts (not shown) of the time line-signal record relay 273 only when the latter relay is energized. The signals are developed across a resistor 289 and are applied in a voltage divider network including the latter resistor and fixed resistors 290 and 291 connected between the B+ and B— terminals. The square wave signal developed across the resistor 289 is applied through coupling capacitor 290 to the grid circuit of the amplifier tube 291 forming part of the pulse generator 125 referred to above. Resistor 292 provides grid leak or D.C. return for the amplifier 291 and resistor 293 provides the conventional cathode bias. The output signal from the amplifier 291 appears across plate load resistor 294 and this signal is coupled through condenser 295 to the grid circuit of a blocking oscillator 296. A diode 297 connected between the grid and cathode of the blocking oscillator tube clips the negative half of the input signal but the positive half of this signal triggers the circuit in the usual manner to develop an output signal in the control transformer 298. The output signal from the blocking oscillator is applied through signal conductor 299 and through relay contacts 276b to the grid circuit of the amplifier 275 whenever the relay 273 is energized.

Any error signal supplied by the network 262 to the servo-amplifier 116 excites the associated servo-motor which is, in turn, connected through a mechanical drive indicated by the reference numeral 116a in FIG. 1 to drive the movable arm 343 of a potentiometer 345, connected in the storage potentiometer circuit 130 referred to above. This potentiometer circuit also includes a reference or zeroing potentiometer 344 having a movable arm 342. These potentiometers 344 and 345 are connected in a bridge network including fixed resistors 346, 347, 348 and 349. Resistors 346 and 347 are connected together at one end to a terminal 350 leading to a source of positive potential, for example, a 250 volt positive source while resistors 348 and 349 are joined together and are connected to ground with the result that the 250 volt source serves to excite the bridge. The output signal from the potentiometer bridge circuit 130 appears across leads 351 and 352 and is applied to the servo-amplifier 116 through the contacts 261a and 261b of the relay 259 when the latter is in its energized condition, that is, when the relay 261 is energized at the end of the recording cycle as described more fully hereinafter. Thus, as each time correction is made by supplying an error signal to the servo-amplifier 116, the movable arm 343 is driven by an amount corresponding to the time correction introduced. The arm 342 may be adjusted manually to establish a zero or reference point for comparison with the voltage appearing between the motor driven arm 343 and ground to unbalance the bridge network 130 and to permit the latter network to remember or store the total corrections. At the end of the recording cycle, the total corrections introduced are applied through the contacts of relay 259 to the input of the servo-amplifier 116 thus driving the shaft 112 in a proper direction and by an amount sufficient to move the tracking drum 21 to its zero position in readiness for the beginning of the next recording cycle. During this resetting operation the arm 343 is driven by the servo-motor until it reaches the zero position or, more specifically, until the bridge circuit 130 no longer provides a drive signal for the servo-motor.

A relay 353 is employed to control the circuit operation in the event that the arm 343 is driven beyond predetermined limit positions at any time during the cycle. Thus, the relay 353 includes an operating coil 354 connected in series with a potentiometer 355 across the signal connectors 351, 352. The relay 353 is operated whenever the current flow through its operating coil exceeds a predetermined amount and the potentiometer 355 may therefore be adjusted to set the operating level for the relay. In the event that the arm 343 is driven in either direction beyond predetermined limits, the current flow through the operating coil 354 exceeds the operating level for the relay 353 and, as a result, this relay is energized to move its contacts 353a, 353b, 353c and 353d from their normally open positions shown in FIG. 5 to the closed positions. Obviously, until the arm 343 reaches one of the limit positions, the current flow through the operating coil 354 is insufficient to operate the relay 353 and the contacts remain in their normally open positions illustrated. When the relay 354 is energized, contacts 353c and 353d complete a circuit from a suitable source of power 356 to an indicating light 357 to inform the operator that the storage circuit 130 has been driven beyond one of its limit positions. At the same time, contacts 353a, and 353b short the output of the dual potentiometer network 262 and, hence, prevent the further application of input signals to the servo-amplifier 116 so that the servo-motor will not be driven beyond its limit position.

Considering next the construction of the velocity cam 107 and referring particularly to FIGS. 8, 9 and 10 of the drawings, it will be observed that this cam includes a circular support plate or base 300 supporting a plurality of radially adjustable cam setting devices 301 each including a small permanent magnet. There cam setting devices cooperate to support an endless cam track 302 in the form of a thin, flexible tape formed of a material which will be attracted by the permanent magnets to hold the track in a position defining a cam shaped to introduce the velocity function into the dynamic correcting mechanism 85 referred to above. To permit the adjustment of the devices 301 radially of the plate 300, the latter is provided with a plurality of radially extending elongated slots 303 equi-angularly spaced about the plate. Each of the devices 301 is adjusted by means of a manually operable screw 304 extending adjacent one of the slots 303 and through fixed bosses or collars 305 and 306 secured to the plate 300 near the opposed ends of the slot 303. Near each inwardly disposed boss 305, the plate is provided with an opening 307 for accommodating the knurled head 308 of the adjusting screw. The screw 304 is rotatably supported within the collars 305 and 306 so that when the head 308 is turned, the screw does not move radially of the plate 300 but is instead effective to move its associated cam setting device 301 radially of the plate within the guide slot 303. To this end, as is best shown in FIG. 9, each of the devices 301 includes a support block 309 of non-ferrous material such as brass, having a portion disposed within the associated slot 303 and having a tapped bore 310 therein for accommodating the threaded shank of the screw 304. A reduced portion 311 of the block cooperates with the main body to define a shoulder 312 against which is seated the support structure for the permanent magnet in the device 301. More specifically, this support structure comprises a pair of plates or pole pieces 313 and 314 embracing a permanent magnet 315. The plates 313 and 314 have their ends crimped or notched at one end as indicated at 315 to hold the magnet and at their other end they extend beyond the end of the magnet to form a channel. The plates are of ferrous material so that they form pole pieces for establishing a magnetic field adjacent the channel. The spacing between the plates 313 and 314 is somewhat less than the width of the tape or band 302 so that the latter band cannot be drawn into the channel. The tape spans the channel to create a smooth curve, a condition which could not be achieved if the tape where darwn tightly against the flat end of the magnet. The magnet and its supporting plates are held in position by a washer 317 and a screw 318 threaded into a tapped axial bore in the end of the block 309.

Obviously, when the screw 304 is turned, the block 309 is prevented from rotating by engagement with the walls of the slot 303 and, hence, the block moves axially along the screw 304 to adjust the radial position of the device 301. All of the screws 304 are adjusted prior to the conversion of each trace on the record 24 in order to set in the appropriate velocity function for that particular trace. The setting of the screws will, of course, be determined by the velocity function to be supplied by the cam 107 and, by appropriate adjustment of these screws, the tape 302 can assume any desired configuration to supply velocities varying from 6,000 to 20,000 feet per second.

The ends of the tape 302 carry pivot blocks which are secured for pivotal movement about a pin 319 secured to the plate 300 as, for example, to a collar 320. The blocks 309a and 309b shown in FIG. 8 do not carry cam setting devices 301 in view of the fact that the cam configuration shown in FIG. 8 leaves insufficient space near the center of the plate to permit such devices to be placed on these blocks. Thus, the blocks 309a and 309b serve to limit inward movement of the tape 302 near its two ends.

A hub 321 is suitably secured to the plate 300 near its center in order to support the latter plate upon the shaft 77. The hub may be splined or keyed to the shaft so that the entire cam structure 107 is driven in synchronism with the drums 22 and 23. A Prony brake 322 is provided to arrest the rotation of the shaft 77.

Figure 7:
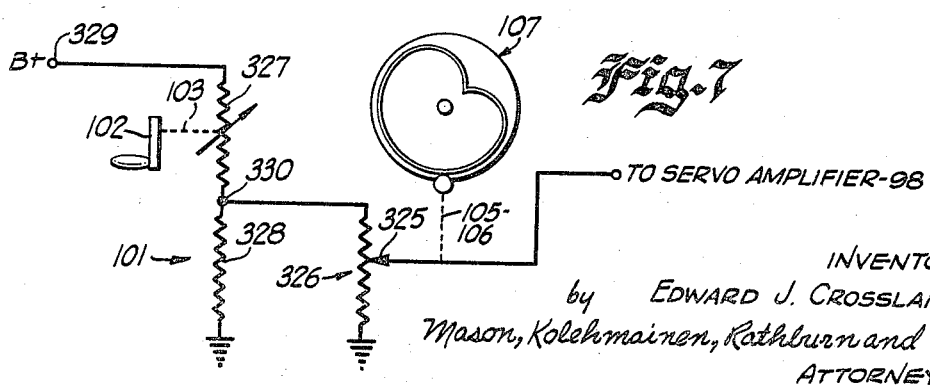
FIG. 7 is a partially schematic, partially diagrammatic view illustrating the manner in which the dynamic corrections are introduced during playback or conversion of the variable amplitude records.

The rotation of the cam 107 transmits the velocity function to a cam follower 106 including a roller 323 in engagement with the tape 302. The cam follower 106, as is best shown in FIG. 7, is connected through the linkage 105 to drive the movable arm 325 of a potentiometer 326 in the potentiometer circuit 101. The arm of the potentiometer 326 is connected to supply input signals to the servo-amplifier 98 in the manner indicated above.

The potentiometer 326 is connected in a voltage divider network which includes a potentiometer 327 and a fixed resistor 328 energized from a suitable source of D.C. potential supplied between terminal 329 and ground. The resistance of the potentiometer 327 is varied by turning hand crank 102 to set in the geophone to shot-point distance in the manner previously described. The potentiometer 327 is non-linear and causes the voltage appearing between junction 330 and ground to vary as a function of $X^2$ in Equation 1 above. This distance is set in prior to the conversion of each trace from the record 24 and establishes the potential across the potentiometer 326 for that particular trace. When the signal potentiometer 326 is varied by the cam 107, a signal is supplied to the servo-amplifier 98 which signal is unbalanced with respect to the signal from the balanced potentiometer 97 so that the servo-motor 95 is driven in a direction to restore the balanced condition. In practice, the cam 107 continually drives or changes potentiometer 325 and the balancing potentiometer 97 and the servo-motor 95 track this variation very closely so that the output shaft 86 from the dynamic correction mechanism 85 introduces the spread correction in the manner previously described.

Figure 6:
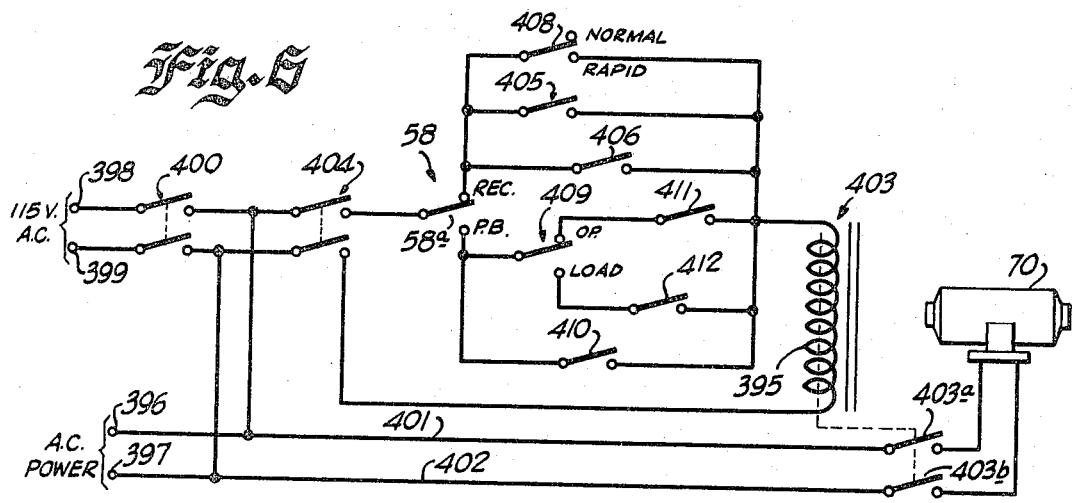
FIG. 6 is a schematic diagram showing the circuit for energizing the drive motor for driving both the tracking drum and the magnetic and cross section record in the apparatus shown in FIG. 1.

Considering next the power circuits for energizing the apparatus 20 and referring first to FIG. 6, the circuit there shown is an alternating current circuit for energizing the motor 70 used in driving the drum 21 and the drums 22 and 23. A.C. power for this circuit is derived from a suitable source connected to terminals 398 and 399 which is applied through a manually operated Main Power On-Off switch 400 to power conductors 401 and 402. These power conductors are connected through normally open contacts of a motor start relay 403 to the drive motor 70. The latter circuit is, of course, completed only when the relay 403 is energized in the manner described more fully below. The power conductors 401 and 402 are also connected to supply A.C. power to terminals 396 and 397 for use in other portions of the apparatus.

In order to energize the relay 403, a manually operated Motor On-Off switch 404 is closed whereupon one side of the operating coil 395 of the relay 403 is connected to the terminal 399 while the other side of this operated coil is connected to a control circuit including section 58a of the Playback-Record switch 58 referred to above. When it is desired to reproduce a trace from the record 24 and to record corresponding traces on either or both of the recording mediums 22a and 23a, the switch 58 is placed in the Record position illustrated in FIG. 6, whereupon power is available for energizing the relay 403. The circuit to the latter relay is completed by temporarily depressing a manually operated Record Start switch 405. When the relay 405 is closed, the operating coil 395 is, of course, energized and the contacts 403a and 403b of the relay 403 are closed to complete the drive circuit to the motor 70. At this time, the tracking drum 21 and the drums 22 and 23 are driven in synchronism through the drive mechanism 27 referred to above. When the tracking drum 21 is turned, a cam 407 (FIG. 1) mounted upon the drum shaft 26 disengages a normally closed micro-switch 406 by moving a switch operating finger 407a on the cam out of engagement with the switch operating arm. The micro-switch 406 thus remains in its normally closed position throughout the remainder of the recording cycle to supply power to the operating coil 395 when the switch 405 is released and opened. Thus, the switch 405 serves merely to start the operation and it may be released as soon as the cam 407 has turned slightly to allow the switch 406 to close. Power may also be supplied to the operating coil 395 by placing a manually operated Normal-Rapid switch 408 in the Rapid position. The latter switch bypasses both the manually operated record start switch 405 and the micro-switch 406 and, hence, may be used to turn the drum 21 at relatively high speed irrespective of the operation of the micro-switch 406. Under normal conditions, however, the switch 408 is in the Normal position and the relay 403 is energized during the recording cycle through the switch 405. At the end of this recording cycle, the switch operating finger 407a on the cam 407 engages and opens the micro-switch 406 thus interrupting the circuit to the coil 395. It will, of course, be recognized that the switch 405 has, at this time, been released and has, therefore, reverted to its open position. Thus, at the end of the recording cycle, the relay 403 is deenergized and its contacts 403a and 403b open in order to break the circuit to the motor 70, thus automatically terminating the rotation of the drums 21, 22 and 23.

During playback, that is, when signals on the magnetic tape 23a are played back in the manner indicated above, the Record Playback switch 58 is placed in the Playback position. Under these conditions, the circuit to the operating coil 395 may be completed by temporarily closing a manually operated Playback Start switch 410, thus energizing the relay 403 and closing the contacts 403a and 403b to complete the circuit to the motor 70. When the signals on the magnetic tape are to be played back, a manually operated Load-Operate switch 409 is placed in the Operate position illustrated in FIG. 6, thus supplying power to the operating coil 395 through a normally closed micro-switch 411. The latter switch is operated by a cam 413 (FIG. 1) mounted on the shaft 77 referred to above. When the switch 410 is depressed temporarily, the motor 70 is operated to turn the cam 413 from the position shown in FIG. 1 thus allowing the micro-switch 411 to revert to its normally closed position. The latter switch remains closed throughout the playback cycle and at the end of this cycle is engaged by a switch operating finger 413a on the cam 413, an operation which opens the switch and breaks the circuit to the operating coil 395, thus interrupting the power flow to the motor 70. Thus, the micro-switch 411 functions automatically to interrupt the operation of the apparatus 20 at the end of the playback cycle, that is, when the channels on the magnetic tape 23a have been moved past the reproducing heads 51, 51a, 51b, etc.

When it is desired to load the magnetic drum 23 prior to the start of the recording operation, the Playback-Record switch 58 is placed in the Playback position and the switch 409 is thrown to the Load position. If the drums 21, 22 and 23 are not at this time oriented in their loading positions (where one end of the tape 23a can be readily secured to the drum 23 by operation of a suitable record attaching mechanism of the type described in copending application Ser. No. 612,779 of James E. Hawkins et al., filed Sept. 28, 1956 and assigned to the same assignee as the present invention, now Patent No. 3,046,553), the switch 410 may be depressed and held in the closed position until the drive motor 70 has moved the drums to these positions. The switch 410 is, of course, released to stop the drums at their loading positions and the end of the tape 23a is then attached to the drum in the manner indicated above. After one end of the tape 23a has been secured to the drum 23, the switch 410 may be temporarily depressed to start the drum rotation. The operator, at this time, holds the record and guides it while the drum rotates. The rotation of the drum causes a cam 414 to move out of engagement with a normally closed micro-switch 412, thus allowing the latter switch to close and complete a circuit to the operating coil 395 in order to maintain the motor 70 in operation even after the switch 410 is released. The loading procedure continues through substantially one complete revolution of the drums and is automatically terminated at the completion of this revolution by engagement of a switch operating finger 414a on the cam 414 with the micro-switch 412. When the cam 414 opens the switch 412 at the end of the loading revolution, the circuit to the operating coil 395 is interrupted and the motor stops automatically with the loading mechanism again being positioned so that it is accessible to the operator. At this time, the free end of the tape 23a may be detachably secured to the drum 23. This loading procedure may be repeated for the tracking drum 21 and the cross section record drum 22 and after all of these drums have been loaded, the apparatus is ready for the recording cycle to begin.

A D.C. circuit for controlling the speed of operation of the drive mechanism 27 is illustrated in FIG. 11. This circuit receives power supplied from a suitable D.C. source across a pair of terminals 415 and 416. When the Record-Playback switch 58 is in the Playback position, a switch section 58b connects the terminal 415 through a line 422 to supply power for energizing one of the clutches in the gear reduction and clutch unit 72. This clutch is indicated in FIG. 11 as the number 3 clutch, although it is not otherwise shown in the drawings since it may be of any conventional electrically operated type. When the number 3 clutch is energized, the output shaft 71 is connected through the gear reduction unit 72 to drive the shaft 73 at relatively high speed. More specifically, the shaft 73 is driven at considerably higher speed during the playback operation than during the record cycle. During the record cycle, the tracking drum must be driven at relatively slow speed in order to permit either the manual or automatic tracking of the record traces. The drums 22 and 23 are, of course, driven at the same speed since a common drive mechanism is employed and, for this reason, the frequencies of the signals recorded on the magnetic tape 23a are very low. Low frequency signals are very hard to handle since they do not readily adapt themselves to filtering and the like and, for this reason, the magnetic drum 23 is driven at much higher speed during playback. This high speed operation not only increases the frequency of the reproduced signals so that they can be adequately filtered but, in addition, it also speeds up playback process.

When the switch 58 is placed in the Record position, terminal 415 is connected through a signal connector 423 to a clutch in the unit 72 designated as the number 4 or disconnect clutch. The number 4 clutch is energized throughout the recording cycle to connect the shaft 71 to the shaft 88. During playback the switch 58 breaks the circuit to the disconnect clutch number 4 which is thus de-energized to break the connection between the shafts 71 and 88. This removes the large mass and high inertia load of the tracking drum 21 during the high speed playback cycle.

To start the recording operation with the switch 58 in the Record position, the switch 405, referred to above, is temporarily depressed. This switch includes a second switch section 405a which, when closed, completes a circuit to the operating coil 261 of the playback record relay 259 referred to above. The latter relay is, of course, energized to close its contacts. Movable pole 261d illustrated in FIG. 11 is thus moved into engagement with fixed contact 261e to complete a holding circuit from the terminal 415 through signal connector 417, through a micro-switch 418 and through section 408a of the Normal-Rapid switch 408 referred to above to the operating coil 261. The relay 259 thus remains energized even though the Record-Start switch is released to open the switch section 405a. When the contact 261d engages the fixed contact 261e, a circuit is also completed to energize a number 2 or Record clutch in the unit 72, thus connecting the shaft 71 to drive the shafts 73 and 88 at the normal or relatively low recording speed.

The relatively slow operation can be changed to rapid operation at any time during the cycle by manual operation of the switch 408. More particularly, when the switch 408 is thrown to the Rapid position, the switch section 408a interrupts the holding circuit for the coil 261 and, as a result, the relay 259 is deenergized. Movable pole 261d thus engages fixed contact 261f to break the circuit to the number 2 clutch and to complete a circuit to the number 1 or Rapid clutch. When the number 1 clutch is energized, the unit 72 is rendered effective to drive the shafts 73 and 88 at relatively high speed. High speed operation may be desired in order to advance the tracking drum through areas where no signals are to be reproduced or to advance the drum near the end of the trace where no usable information has been recorded.

A normally closed micro-switch 418 may also be provided for automatically rendering the drive mechanism 27 effective to drive the shafts 73 and 88 at rapid or high speed. This micro-switch is adapted to be engaged and operated by a switch operating finger 419a formed upon a cam 419 which is driven from the shaft 26. The switch 418 and/or the cam 419 may be adjusted so that the switch is opened automatically when all of the useful information has been derived from one of the traces. Thus, the switch may be moved to a position where rapid operation is automatically effected as soon as all of the reflected wave energy on the trace has been tracked or reproduced. When the switch 418 is engaged, the circuit to the coil 261 is, of course, broken so that the movable arm 261d moves into engagement with the fixed contact 261f with the results described above.

When the number 1 clutch is energized to effect high speed operation, a normally open micro-switch 420 operates automatically to slow down the drum near the end of the cycle so that the drum does not approach its zero position while traveling at very high speed. More specifically, the micro-switch 420 is adapted to be engaged and closed by a cam operating portion 421a on a cam 421 mounted upon the drum shaft 26. Near the end of the cycle, the portion 421a engages the micro-switch 420 to complete a circuit to the coil 261. This circuit remains completed throughout the remaining portion of the cycle. When the operating coil 261 is energized by closing of switch 420, the movable arm 261b is moved out of engagement with fixed contact 261f and into engagement with fixed contact 261e, thus deenergizing the number 1 or rapid clutch and re-energizing the number 2 or slow speed clutch.

In view of the foregoing description, it will be recognized that the above enumerated objects of the invention have been accomplished by the apparatus described. The operation is substantially automatic and, hence, can be conducted with a minimum amount of manual supervison.

While a particular embodiment of the invention has been described and illustrated, it will be recognized that many modifications will readily occur to those skilled in this art and it is, therefore, contemplated by the appended claims to cover any such modifications as fall within the true spirit and scope of the present invention.

What is claimed as new and desired to be secured by Letters Patent of the United States is:

1. In an apparatus for reproducing and recording seismic signals the combination of means for snpporting a seismic record having thereon a timing signal and a plurality of seismic traces recorded as a function of time, means for repeatedly driving said record supporting means past a reproducing means in order to reproduce the timing signal and one of the seismic traces during each cycle of movement of the record supporting means, means for re-recording the reproduced seismic trace upon a record medium, means for generating a standard timing signal corresponding to the desired speed of drive of the record supporting means, means jointly responsive to the standard signal and to the reproduced timing signal for developing a control signal whenever the reproduced timing signal deviates from the standard signal, means responsive to the control signal for applying a correction to the driving means in order to change the speed of drive of the record supporting means in a direction tending to bring the reproduced timing signal into coincidence with the standard signal, means for adding up the total effective corrections applied to the driving means during each cycle to develop a zeroing signal, and means for supplying said zeroing signal to the driving means at the end of each cycle in order to drive the record supporting means an amount sufficient to zero it for the next cycle.

2. In an apparatus for reproducing an recording seismic signals the combination of means for supporting a seismic record having thereon a timing signal and a seismic trace recorded as a function of time, means for driving said record supporting means, means for reproducing both the timing signal and the seismic trace as the record supporting means is driven, means for re-recording the reproduced seismic trace upon a record medium, means for generating a standard timing signal corresponding to the desired speed of drive of the record supporting means, means for periodically comparing the standard signal with the reproduced timing signal and for applying an error correction to the driving means in the event of deviation in order to bring the reproduced timing signal into coincidence with the standard signal, means for adding up the total error corrections during the reproduction of the trace, and means for supplying the total error corrections to the driving means following the reproduction of the seismic trace.

3. In a seismic reproducing and recording apparatus for use with a seismic record having a plurality of side by side traces of the variable amplitude type, movable curve following means for tracking the variable amplitude traces of the seismic record one at a time and in sequence and for developing signals varying in accordance with the amplitude variations of each trace, a magnetic recorder for recording upon a magnetizable medium the developed signals to form a series of channels respectively corresponding to said traces, means including a switch manually operable between first and second operating positions for supplying the developed signals to the magnetic recorder when the switch is in the first of said positions, means including a plurality of reproducing heads for simultaneously playing back the magnetizable medium to reproduce the channels, means for composition the signals produced by the reproducing heads to develop a composite signal, means for recording the composite signal upon a final record in visible form, and means including said switch for rendering the last mentioned recording means effective to develop said final record when the switch is in the second of said positions.

4. The apparatus defined by claim 3 wherein means are provided for relatively displacing the magnetizable medium and the seismic record prior to the tracking of each trace in order to introduce static time corrections, and wherein means are provided for relatively displacing the magnetizable medium and the seismic record during the tracking of each trace in order to introduce dynamic time corrections.

5. The apparatus defined by claim 3 wherein means are provided for relatively displacing the magnetizable medium and the seismic record prior to the tracking of each trace in order to introduce static time corrections.

6. The apparatus defined by claim 3 wherein means are provided for relatively displacing the magnetizable medium and the seismic record during the tracking of each trace in order to introduce dynamic time corrections.

7. The apparatus defined by claim 3 wherein means are provided for supplying the developed signals to the recording means when the switch is in the first position in order to develop simultaneously with the recording of each channel a visible record for use as a monitor.

8. In an apparatus for reproducing seismic signals the combination of means for supporting a seismic record having thereon a seismic trace recorded as a function of time, means for driving said record supporting means, means for reproducing the signals from the seismic trace as the record supporting means is driven, means for generating a drive signal corresponding to the speed of drive of the record supporting means, means for generating a standard timing signal corresponding to the desired speed of drive of the record, means for periodically comparing the standard signal with the drive signal and for applying an error correction to the driving means in the event of deviation therebetween, means for algebraically combining the total error corrections during the reproduction of the trace to develop an error control signal, and means for supplying the error control signal to the driving means following the reproduction of the seismic trace.

9. In an apparatus for reproducing seismic signals the combination of means for supporting a seismic record having thereon a timing signal and a seismic trace recorded as a function of time, means for driving said record supporting means past a reproducing means in order to reproduce the timing signal and the seismic trace, means for generating a standard timing signal corresponding to the desired speed of drive of the record supporting means, means jointly responsive to the standard signal and to the reproduced timing signal for developing a control signal whenever the reproduced timing signal deviates from the standard signal, means responsive to the control signal for applying a correction to the driving means in order to change the speed of drive of the record supporting means, means for adding up the total effective corrections applied to the driving means during the reproducing cycle to develop a zeroing signal, and means for supplying said zeroing signal to the driving means at the end of said cycle in order to drive the record supporting means an amount sufficient to zero it for the next cycle.

10. In an apparatus for reproducing a seismic signals the combination of means for supporting a seismic record having thereon a timing signal and a seismic trace recorded as a function of time, means for driving said record supporting means, means for reproducing both the timing signal and the seismic trace as the record supporting means is driven, means for rerecording the reproduced seismic trace upon a record medium, means for generating a standard timing signal corresponding to the desired speed of drive of the record supporting means, means for periodically comparing the standard signal with the reproduced timing signal and for applying an error correction to the driving means in the event of deviation in order to bring the reproduced timing signal into coincidence with the standard signal, means for adding up the total error corrections during a reproduction of the trace, and means for supplying the total error corrections to the driving means following the reproduction of the seismic trace.

11. In a reproducing and recording apparatus for use in reproducing a plurality of variable amplitude osciallographic type seismic traces recorded visually in side by side relationship upon a seismic record as a result of signals arriving at a geophone array from a source of seismic waves, tracking means including a curve follower movable to follow the amplitude variations of each trace, means for driving said record repeatedly past said curve follower, means controlled by the movements of said curve follower for developing signals corresponding to one of said traces for each cycle of movement of the record, means for controlling said driving means to alter the rate of movement of said record past said reproducing means to correspond with the rate of original recording of said traces upon the seismic record, means for recording the developed signals one trace at a time upon a record medium by driving said medium repeatedly past a recording device and by supplying the developed signals to the device, means for relatively displacing the seismic record and the record medium prior to each cycle in order to introduce static time corrections, and means for relatively displacing the seismic record and the record medium during each cycle in order to introduce dynamic corrections, the last named means including a servo-motor circuit for relatively displacing the record medium and the seismic record, the servo-motor circuit including an impedance network in its input circuit, said impedance network including a first variable impedance adjustable prior to each cycle for supplying a signal in accordance with the geophone to source distance and a second variable impedance adjustable during each cycle for supplying a signal corresponding to the velocity of propagation of the earth formations.

12. The apparatus defined by claim 11 wherein the servo-motor circuit is connected to alter the seismic record during means in order to effectively displace the seismic record with respect to the record medium, the output of the servo-motor circuit being connected to drive a differential mechanism in order to introduce the displacement.

13. In an apparatus for reproducing signals from a variable amplitude oscillographic type seismic recording having recorded thereon a seismic trace, said trace extending generally longitudinally along said record and having variations extending transversely of said record to represent deviations in said trace from a base extending generally longitudinally of said record, tracking means including a curve follower movable transversely of the record to follow the amplitude variations of said variable amplitude trace for developing electrical signals varying in amplitude in response to the amplitude variations of said trace, means for moving said tracking means and said record relative to each other in a direction extending generally longitudinally of the record, any undesired skew of said base relative to the longitudinal axis of said record being effective to cause said tracking means to produce undesired long term D.C. variations, and means coupled to said tracking means for recording said electrical signals, the last named means including means for eliminating said long term D.C. variations.

14. The apparatus defined by claim 13 wherein the means for eliminating the long term variations comprises an amplifier for amplifying said electrical signals, said amplifier including means rendering it insensitive to the long term variations.

15. The apparatus defined by claim 14 wherein the means rendering the amplifier insensitive to the long term variations includes a large capacitor in the input to the amplifier for coupling said electrical signals to the amplifier input but for eliminating the long term variations.

16. In an apparatus for translating an oscillographic seismic trace record having timing lines thereon into a reproducible trace record including trace follower means to effect a scanning motion along the oscillographic trace, recording means in movable relation with a reproducible record medium and responsive to said trace-follower means to record a trace on said medium varying in a reproducible quality in accordance with the oscillations in said oscillographic trace, means for developing electrical signals from said timing lines, means for generating a standard timing signal, means for comparing said electrical signals with said timing signal to develop a control signal upon the occurrence of timing distortions along said oscillographic trace, means responsive to said control signal to vary the rate of said scanning motion relative to the rate of motion between said recording means and said record medium in order to correct the reproducible trace for such distortions, and means to correct said reproducible record trace for seismic errors existing in said oscillographic trace.

17. A method as defined in claim 16 wherein the reproducible trace record is recorded at a constant rate.

18. A method as defined in claim 17 in which the oscillographic trace record requires spread correction along its length, and the oscillographic trace record is moved during the scanning step to incorporate such a correction with the reproducible trace record.

19. In a method of translating an oscillographic seismic trace record requiring spread correction and having timing signals with time distortions along its length into a corrected reproducible seismic trace record which includes the steps of scanning the length of the oscillographic trace record and simultaneously recording the reproducible trace record while varying the reproducible quality of the latter trace record in response to oscillations in the oscillographic trace record, the improvement which comprises causing a first difference between the rate of scanning and the rate of recording to enter a continuous spread correction within the reproducible trace record, developing electrical signals corresponding to said timing lines, generating a timing signal, comparing said timing signal and said electrical signals to develop a control signal upon the occurrence of time distortions along the oscillographic record, utilizing said control signal to vary the rate of scan of the oscillographic trace record relative to the recording rate of the reproducible trace record, thereby to correct said reproducible trace record for said time distortions.

20. An apparatus as defined in claim 19 in which the reproducible record medium is photosensitive film and the recording means is of a character to form a variable-density trace on said film.

21. In an apparatus for translating an oscillographic seismic trace record having timing lines thereon into a reproducible seismic trace record including trace-follower means arranged in scanning relation with oscillographic trace, a reproducible recording medium and recording means arranged in longitudinally movable relation with said medium and responsive to scanning motions between said trace-follower means and said oscillographic record to record a trace on said medium varying in a reproducible quality in accordance with the oscillations of said oscillographic trace, the improvement which comprises spread correction means arranged to move said oscillographic trace record lengthwise relative to said trace-follower means to enter a continuous spread correction within said reproducible trace, means for developing electrical signals from said timing lines, means for generating a standard timing signal, means for comparing said electrical signals with said timing signal to develop a control signal upon the occurrence of timing distortions along said oscillographic trace, and means responsive to said control signal to vary the rate of said scanning relative to the rate of said recording.

22. In a method of translating an oscillographic seismic trace record having timing lines thereon into a reproducible seismic trace record which includes the steps of scanning the length of the oscillographic trace record and simultaneously recording the reproducible trace record while varying the reproducible quality of the latter trace record in response to oscillations in the oscillographic trace record, developing electrical signals corresponding to said timing lines, generating a timing signal, comparing said timing signal and said electrical signals to develop a control signal upon the occurrence of time distortions along the oscillographic record, utilizing said control signal to vary the rate of scan of the oscillographic trace record relative to the recording rate of the reproducible trace record upon the occurrence of time distortions in the oscillographic trace record to keep said trace records in seismic record time synchronism.

23. In an apparatus for reproducing and recording seismic signals the combination of means for supporting an oscillographic type seismic record having thereon a timing signal and a plurality of seismic traces recorded as a function of time, means for repeatedly driving said record supporting means past a reproducing means in order to reproduce the timing signal and one of the seismic traces during each cycle of movement of the record supporting means, means for re-recording the reproduced seismic trace in reproducible form upon a record medium, means for generating a standard timing signal corresponding to the desired speed of drive of the record supporting means, means jointly responsive to the standard signal and to the reproduced timing signal for developing a control signal whenever the reproduced timing signal deviates from the standard signal, and means responsive to the control signal for applying a correction to the driving means in order to change the speed of drive of the record supporting means in a direction tending to bring the reproduced timing signal into coincidence with the standard signal, thereby to correct the reproducible record recorded on said medium for time distortions occurring in the timing lines recorded on said oscillographic record.

24. In an apparatus for reproducing and recording seismic signals the combination of means for supporting an oscillographic type seismic record having thereon a timing signal and a seismic trace recorded as a function of time, means for driving said record supporting means, means for reproducing both the timing signal and the seismic trace as the record supporting means is driven, means for re-recording the reproduced seismic trace in reproducible form upon a record medium, means for generating a standard timing signal corresponding to the desired speed of drive of the record supporting means, and means for periodically comparing the standard signal with the reproduced timing signal and for applying an error correction to the driving means in the event of deviation in order to bring the reproduced timing signal into coincidence with the standard signal, thereby to correct the reproducible record recorded on said record medium for time distortions occurring in the timing lines recorded on said oscillographic record.

25. Apparatus for developing signals from a variable amplitude oscillographic type seismic record having timing lines thereon and for re-recording the developed signals; said apparatus comprising a drum for supporting said variable amplitude record, means including a drive motor for rotating said drum, follower means movable transversely of the record for tracking the variable amplitude record to develop corresponding electrical signals as the drum is rotated, means for re-recording the electrical signals upon a record medium, means including said motor for driving the record medium simultaneously with the drum, means for generating a timing signal corresponding to the desired rate of rotation of said drum, means for developing electrical signals corresponding to said timing lines, means for comparing said timing signal and said electrical signals to develop a control signal upon the occurrence of distortions of the spacings between the timing lines, and means responsive to said control signal for varying the drive of said drum to introduce time corrections to compensate for said distortions in the record recorded on said medium.

26. The apparatus defined by claim 25 wherein there is further provided means for introducing dynamic time corrections, the last named means comprising a velocity cam driven by said motor and means operated by said cam for varying the relative rates of rotation of said drum and driving of said record medium.

References Cited by the Examiner

UNITED STATES PATENTS

| | | | |
|---|---|---|---|
| 2,440,971 | 5/1948 | Palmer | 340—15.5 |
| 2,604,955 | 7/1952 | Hawkins | 340—15 X |
| 2,633,036 | 3/1953 | Winter | 74—568 |
| 2,679,622 | 5/1954 | Deri | 318—31 |
| 2,714,202 | 7/1955 | Downing | 340—174.1 |
| 2,744,225 | 5/1956 | Rorden | 318—32 |
| 2,751,439 | 6/1956 | Burton | 340—174 |
| 2,791,288 | 5/1957 | Meier | 340—15 |
| 2,796,597 | 6/1957 | Poorte | 340—174.1 |
| 2,803,809 | 8/1957 | Tilley | 340—15 |
| 2,839,615 | 6/1958 | Sarratt | 340—174.1 |
| 2,858,523 | 10/1958 | Hawkins | 340—15 |

(Other references on following page)

UNITED STATES PATENTS

| | | | |
|---|---|---|---|
| 2,876,423 | 3/1959 | Skelton | 340—15 |
| 2,883,557 | 4/1959 | Gallo | 250—219.1 |
| 2,887,890 | 5/1959 | Schardt | 74—110 |
| 2,937,239 | 5/1960 | Garber | 340—174.1 |
| 2,990,535 | 6/1961 | Parkinson et al. | 340—15.5 |
| 2,994,851 | 8/1961 | Bucy et al. | 340—15.5 |
| 3,033,990 | 5/1962 | Johnson | 340—15.5 X |
| 3,080,545 | 3/1963 | Perry et al. | 340—15.5 |
| 3,110,878 | 11/1963 | Horeth et al. | 340—15.5 |

BENJAMIN A. BORCHELT, *Primary Examiner.*

IRVING L. SRAGOW, CHESTER L. JUSTUS, *Examiners.*

N. N. KUNITZ, V. CARNEY, A. E. HALL, R. M. SKOLNIK, *Assistant Examiners.*